(12) United States Patent
Sugiyama

(10) Patent No.: US 8,684,560 B2
(45) Date of Patent: Apr. 1, 2014

(54) SEMICONDUCTOR LIGHT SOURCE APPARATUS AND LIGHTING UNIT

(75) Inventor: Takashi Sugiyama, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 208 days.

(21) Appl. No.: 12/949,776

(22) Filed: Nov. 18, 2010

(65) Prior Publication Data

US 2011/0116253 A1 May 19, 2011

(30) Foreign Application Priority Data

Nov. 18, 2009 (JP) ................... 2009-262588
Nov. 19, 2009 (JP) ................... 2009-263492
Nov. 26, 2009 (JP) ................... 2009-268330

(51) Int. Cl.
| | |
|---|---|
| F21V 9/00 | (2006.01) |
| F21V 9/16 | (2006.01) |
| F21V 19/02 | (2006.01) |
| F21V 5/00 | (2006.01) |

(52) U.S. Cl.
USPC .............. 362/293; 362/84; 362/284; 362/332

(58) Field of Classification Search
USPC ............... 362/2, 84, 510, 285, 586, 293, 332, 362/346, 86
See application file for complete search history.

(56) References Cited

U.S. PATENT DOCUMENTS

| | | | |
|---|---|---|---|
| 3,231,746 A * | 1/1966 | Goodrich ................ 250/214 VT |
| 5,426,576 A * | 6/1995 | Hewlett ....................... 362/293 |
| 5,496,427 A * | 3/1996 | Gustafson et al. .............. 156/67 |
| 6,830,343 B2 * | 12/2004 | Song .............................. 353/84 |
| 6,861,638 B2 * | 3/2005 | Bacarella et al. ....... 250/214 VT |
| 6,883,937 B2 * | 4/2005 | Vastola et al. ................ 362/293 |
| 7,128,441 B2 * | 10/2006 | Monch .......................... 362/277 |
| 7,461,950 B2 * | 12/2008 | Yamanaka .................... 362/293 |
| 2005/0269582 A1 | 12/2005 | Mueller et al. |
| 2005/0285981 A1 * | 12/2005 | Wang et al. ................... 348/753 |
| 2006/0164606 A1 * | 7/2006 | Bhowmik ...................... 353/84 |
| 2006/0245093 A1 * | 11/2006 | Kao et al. ...................... 359/892 |
| 2007/0064432 A1 * | 3/2007 | Kubo ............................ 362/341 |
| 2008/0180823 A1 * | 7/2008 | Tso et al. ...................... 359/892 |
| 2009/0187234 A1 * | 7/2009 | Meyer et al. .................... 607/88 |

FOREIGN PATENT DOCUMENTS

| | | |
|---|---|---|
| JP | 2004-55360 A | 2/2004 |
| JP | 2004-341105 A | 12/2004 |
| JP | 2006-005367 A | 1/2006 |

* cited by examiner

*Primary Examiner* — Jong-Suk (James) Lee
*Assistant Examiner* — Bryon T Gyllstrom
(74) *Attorney, Agent, or Firm* — Kenealy Vaidya LLP

(57) ABSTRACT

A semiconductor light source apparatus can adjust a color tone of white light. The semiconductor light source apparatus can include a phosphor wheel, a motor rotating the phosphor wheel, a light source and a moving module. The phosphor wheel can include at least one phosphor layer configured to emit excited light. The phosphor wheel can vary a mixing ration of white light that is created by light emitted from the light source and the light excited by the at least one phosphor layer in accordance with a position of the phosphor wheel emitted by the light source. The moving module that is connected to the motor can adjust the position of light emitted from the light source. Thus, the disclosed subject matter can provide a semiconductor light source apparatus that can adjust a color tone of white light and a lighting unit using the light source apparatus, which can be used for a projector, lamp, etc.

20 Claims, 16 Drawing Sheets

SEMICONDUCTOR LIGHT SOURCE APPARATUS AND LIGHTING UNIT

This application claims the priority benefit under 35 U.S.C. §119 of Japanese Patent Application No. 2009-262588 filed on Nov. 18, 2009, Japanese Patent Application No. 2009-263492 filed on Nov. 19, 2009, and Japanese Patent Application No. 2009-268330 filed on Nov. 26, 2009, all of which are hereby incorporated in their entireties by reference.

BACKGROUND

1. Field

The presently disclosed subject matter relates to a semiconductor light source apparatus and a lighting unit using the semiconductor light source apparatus, and more particularly to a semiconductor light source apparatus that can change a color tone and a lighting unit that can also emit a large amount of light intensity while it can change a color tone in order to be able to use for a stage light, a street light, a projector, a vehicle light, a spot light, etc.

2. Description of the Related Art

Recently, semiconductor light source devices such as an LED and the like have been used as a light source for a lighting unit. By using characteristics of the semiconductor light source devices, a light source and a lighting unit that can emit various color lights have been developed. A light source and a lighting unit that can change a light-emitting color by using three kinds of LEDs, a red LED, a green LED and a blue LED are disclosed in Patent Document No. 1 (Japanese Patent Application Laid Open JP2004-055360).

The light source disclosed in Patent Document No. 1 may emit various light-emitting colors by controlling each of light intensities of the three LEDs. However, because it is physically impossible to locate the three LEDs at the same position, each of the three LEDs is located at an appropriate interval with respect to each other. Accordingly, when the light source is used for a lighting unit such as a spot light that controls a light distribution via a lens, a color variation may occur around a light distribution pattern because each of the three LEDs is located at a different position, that is, because each optical axis of the three LEDs is different.

In order to improve such a color variation, a light source apparatus using a phosphor wheel that may be used as a light source for projectors such as an overhead projector is disclosed in Patent Document No. 2 (Japanese Patent Application Laid Open JP2004-341105). FIG. 1a is a schematic structural view showing a conventional light source apparatus using a phosphor wheel that is disclosed in Patent Document No. 2 and FIG. 1b is a schematic front view showing the phosphor wheel that is used in the conventional light source apparatus.

The conventional light source apparatus includes the phosphor wheel 91; a motor 94 rotating the phosphor wheel 91; and a semiconductor light source 95 such as a laser diode emitting ultraviolet light. The phosphor wheel 91 includes a red phosphor layer 92a, a green phosphor layer 92b and a blue phosphor layer 92c on a transparent substrate such as a silica glass substrate so that each area of the phosphor layers 92a, 92b and 92c is equally divided by boundary lines 93a, 93b and 93c, which intersect with a rotational axis of the phosphor wheel 91. The semiconductor light source 95 is located adjacent to the phosphor wheel 91.

When the phosphor wheel 91 is rotated at a high speed (e.g. 3,600 rpm) by the motor 94, the red phosphor layer 92a, the green phosphor layer 92b and the blue phosphor layer 92a are excited by the ultraviolet light emitted from the semiconductor light source 95, and therefore the semiconductor light source 95 may emit white light via the phosphor wheel 91 due to an additive color mixture. In this case, because the semiconductor light source 95 can emit the ultraviolet light toward the phosphor wheel 91 at a specific position, the conventional light source apparatus may prevent the semiconductor light source 95 from causing a color variation around a light distribution pattern.

The above-referenced Patent Documents are listed below and are hereby incorporated with their English abstracts in their entireties.

1. Patent document No. 1: Japanese Patent Application Laid Open JP2004-055360
2. Patent document No. 2: Japanese Patent Application Laid Open JP2004-341105

However, although the conventional light source apparatus using the phosphor wheel 91 may prevent color variation, it may not be able to adjust a color tone of light emitted from the semiconductor light source 95. The color tone may be adjusted by preparing each phosphor wheel of the three phosphor layers 92a, 92b and 92c and by controlling each rotation speed of the phosphor wheels of the three phosphor layers 92a, 92b and 92c.

However, it may be difficult to control the respective rotation speeds of the phosphor wheels when at a high speed. In addition, three motors may be required and also a complex controller may be required to control the three motors. Moreover, in the above-described light source apparatus using the phosphor wheel 91, a color breakup may occur although the color variation may be avoided. The color breakup means a phenomenon such that each of red light, green light and blue light are instantaneously recognized in a repetitive manner instead of white light.

When the light source apparatus using the phosphor wheel is used in a normal room, the color breakup may not occur. When the light source apparatus is used in a dark room and when suddenly withdrawing the human eye from a light-emitting spot of the light source, a color breakup may occasionally occur. The color breakup may cause fatigue to the human eye. If the phosphor wheel is rotated at a very high speed, although the color breakup may be almost prevented, sound generated from the motor may increase.

The disclosed subject matter has been devised to consider the above and other problems, characteristics and features. Thus, an embodiment of the disclosed subject matter can include various semiconductor light source apparatuses which can adjust a color tone of white light and can prevent the color breakup of the white light. In this case, the color tone can be adjusted by a structure that includes a moving module for changing a distance between an intersection of an optical axis of a light source and a phosphor wheel and a rotation axis of the phosphor wheel, which thus varies a ratio of mixing lights for the white light according to distance. In addition, a high power LED can be used as the light source due to a radiation effective by a rotation of the phosphor wheel. Thus, the semiconductor light source apparatus can adjust a color tone of an illumination light having a large amount of light intensity, and therefore can be employed for various lighting units such as a projector, a stage light, a street light, general lighting, etc.

SUMMARY

The presently disclosed subject matter has been devised in view of the above and other characteristics, desires, and problems in the conventional art. An aspect of the disclosed subject matter can include providing adjustable semiconductor light source apparatuses for various lighting units such as a projector, in which a color tone of an illumination light having a large amount of light intensity can be adjusted by changing a distance between an intersection of an optical axis of a semiconductor light source and a phosphor wheel and a rotation axis of a phosphor wheel. Moreover, the semiconductor light source apparatuses can prevent a color breakup by using structures that form phosphor layers in a concentric shape or by reducing the number of the phosphor layers. Another aspect of the disclosed subject matter can include providing lighting units using the semiconductor light source apparatus having a favorable light distribution.

According to one aspect of the disclosed subject matter, a semiconductor light source apparatus can include: a motor; a transparent substrate having a plate shape; at least one phosphor layer disposed on a surface of the transparent substrate; an optical multilayer disposed on another surface of the transparent substrate so as to face the at least one phosphor layer; a semiconductor light source; and a moving module being connected to the motor. A rotation axis of the transparent substrate can be connected to a rotation axis of the motor so that the transparent substrate is rotated at a substantially right angle to the rotation axis of the transparent substrate by the motor. The semiconductor light source can be located adjacent the optical multilayer so that an optical axis of the semiconductor light source intersects with both surfaces of the transparent substrate at a substantially right angle while a light-emitting area of the semiconductor light source is located on the at least one phosphor layer via the optical multilayer.

In this case, a distance between the rotation axis of the transparent substrate and an intersection of the optical axis of the semiconductor light source and the surface of the transparent substrate can be adjusted by the moving module. The above-described exemplary semiconductor light source apparatus is a transparent type light source apparatus. A reflection type light source apparatus can be made by replacing the transparent substrate and the optical multilayer with a metallic substrate and by locating the semiconductor light source adjacent to the at least one phosphor layer.

In the above-described exemplary light source apparatuses, the semiconductor light source can be an ultraviolet light-emitting device and the at least one phosphor layer can be configured with a red phosphor layer formed in a fan shape, a green phosphor layer formed in a fan shape and a blue phosphor formed in a fan shape so that a ratio of an arc on the red phosphor layer to an arc on the blue phosphor layer can vary according to an intersection of the arc and a boundary between the red phosphor layer and the blue phosphor layer when writing the arc with respect to the rotation axis of the substrate. The at least one phosphor layer can also be configured with a red phosphor layer formed in a concentric shape, a green phosphor layer formed in a concentric shape and a blue phosphor layer formed in a concentric shape so that the green phosphor layer is located between the red phosphor layer and the blue phosphor layer.

In addition, the semiconductor light source can be a blue LED and the at least one phosphor layer can be configured with a yellow phosphor layer having a plurality of concentrations so that a concentration of the yellow phosphor layer is configured to vary in a stepwise fashion in a direction toward a rotation of the substrate and so that a ratio of an arc on a yellow phosphor layer having a low concentration to an arc on a yellow phosphor layer having a high concentration varies according to an intersection of the arc and a boundary between the yellow phosphor layer having a low concentration and the yellow phosphor layer having a high concentration when writing/drawing the arc with respect to the rotation axis of the substrate. The at least one phosphor layer can also be configured with a yellow phosphor layer having a plurality of concentrations so that a concentration of the yellow phosphor layer is configured to vary in a concentric shape.

According to another aspect of the disclosed subject matter, the semiconductor light source apparatus can include: a motor; a transparent substrate having a plate shape; at least one phosphor layer disposed on a surface of the transparent substrate so as to expose a part of the transparent substrate; an optical multilayer disposed on another surface of the transparent substrate so as to face the at least one phosphor layer; a blue LED; and a moving module being connected to the motor. The blue LED can be located adjacent the optical multilayer so that the optical axis of the blue LED intersects with the both surfaces of the transparent substrate at a substantially right angle while the light-emitting area of the blue LED is located on the part of the transparent substrate exposed from the at least one phosphor layer and the at least one phosphor layer via the optical multilayer.

In this case, a distance between the rotation axis of the transparent substrate and an intersection of the optical axis of the blue LED and the surface of the transparent substrate can be adjusted by the moving module. The immediately above-described exemplary semiconductor light source apparatus is a transparent type light source apparatus. A reflection type light source apparatus can be made by replacing the transparent substrate and the optical multilayer with a metallic substrate and by locating the blue LED adjacent to the at least one phosphor layer.

In the above-described exemplary semiconductor light sources, the at least one phosphor layer can be configured with a red phosphor layer formed in a fan shape and a green phosphor layer formed in a fan shape so that a ratio of an arc on the red phosphor layer to an arc on the part of the substrate exposed from the red and green phosphor layers varies according to an intersection of the arc and a boundary between the red phosphor layer and the part of the substrate when writing/drawing the arc with respect to the rotation axis of the substrate. The at least one phosphor layer can also be configured with a red phosphor layer formed in a concentric shape and a green phosphor layer formed in a concentric shape so that the green phosphor layer is located between the red phosphor layer and the part of the substrate exposed from the red and green phosphor layers.

Moreover, the at least one phosphor layer can be configured with a yellow phosphor layer formed in a fan shape so that a ratio of an arc on the yellow phosphor layer to an arc on the part of the substrate exposed from the yellow phosphor layer varies according to an intersection of the arc and a boundary between the yellow phosphor layer and the part of the substrate when writing the arc with respect to the rotation axis of the substrate. The at least one phosphor layer can also be configured with a yellow phosphor layer formed in a concentric shape so that the yellow phosphor layer is located adjacent to the part of the substrate formed in a concentric shape.

According to the above-described exemplary semiconductor light source apparatuses, a color tone of light emitted from a light source apparatus can be adjusted by the moving module for changing the distance between an intersection of the optical axis of the light source and the at least one phosphor layer and the rotation axis of the substrate because the light source apparatus can vary a ratio of mixing lights for white light according to the distance. Moreover, a high power LED can be used as the light source due to a radiation that is made effective by a rotation of the substrate. Thus, the semiconductor light source apparatus can adjust a color tone of an illumination light having a large amount of light intensity. Furthermore, the semiconductor light apparatus can prevent color breakup with confidence by using structures that form the phosphor layers in a concentric shape or by reducing the number of the phosphor layers.

According to another aspect of the disclosed subject matter, a lighting unit including a semiconductor light source apparatus according to one embodiment can further include a housing located so as to cover the semiconductor light source apparatus and a projector lens having an optical axis located adjacent the housing so that the optical axis of the projector lens substantially corresponds to the optical axis of the light source. The lighting unit can further include at least one convex lens having an optical axis and at least one concave lens having an optical axis that are located adjacent the projector lens so that the optical axes of the at least one convex lens and the at least one concave lens correspond to the substantially optical axis of the projector lens.

In this case, the lighting units including the semiconductor light source apparatus can include the projector lens to form a light distribution in accordance with various usages, and also can further include a zoom lens, which is composed of at least one convex lens and at least one concave lens. Thus, the disclosed subject matter can provide high power lighting units having a favorable light distribution, which can be used for various lighting units such as a projector, a stage lighting, general lighting, etc.

BRIEF DESCRIPTION OF THE DRAWINGS

These and other characteristics and features of the disclosed subject matter will become clear from the following description with reference to the accompanying drawings, wherein:

FIG. 1b is a schematic structural view showing the phosphor wheel of FIG. 1a;

FIG. 12 is a schematic structural view showing a variation of the transmission/reflection type phosphor wheels of FIG. 11a;

FIGS. 15b and 15c are cross-sectional views depicting cross-sections taken along line H-H of the transmission and reflection type phosphor wheels depicted in FIG. 15a, respectively; and.

DETAILED DESCRIPTION OF EXEMPLARY EMBODIMENTS

Figure 1A:
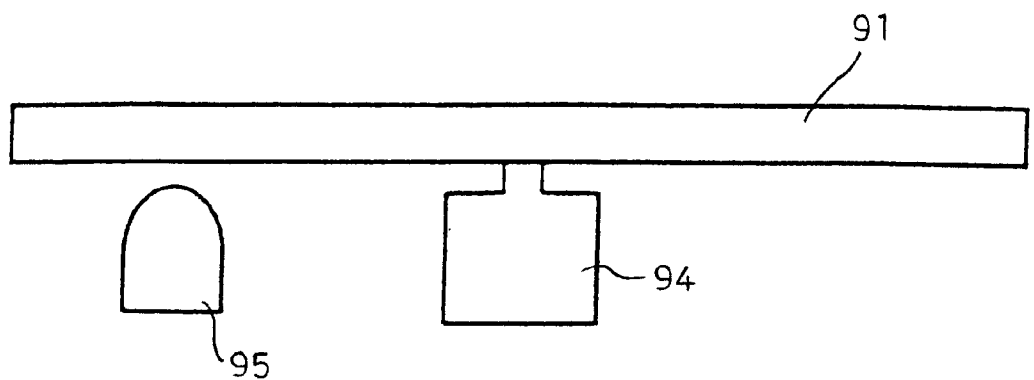
FIG. 1a is a schematic structural view showing a conventional light source apparatus using a phosphor wheel.
Figure 1B:
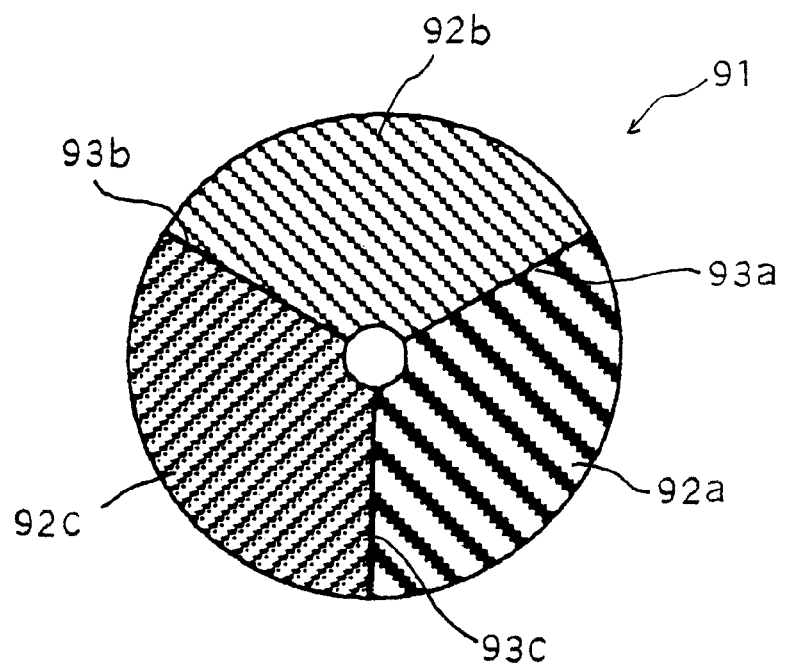
Figure 2A:
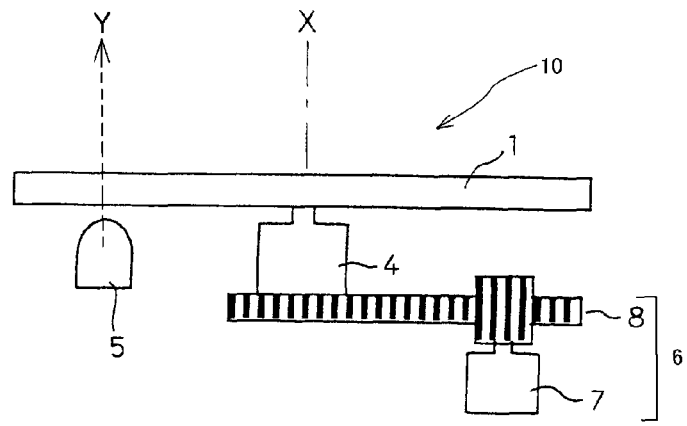
FIGS. 2a and 2b are schematic structural views showing first exemplary embodiments of a transmission type semiconductor light source apparatus and a reflection type semiconductor light source apparatus made in accordance with principles of the disclosed subject matter, respectively.
Figure 2B:
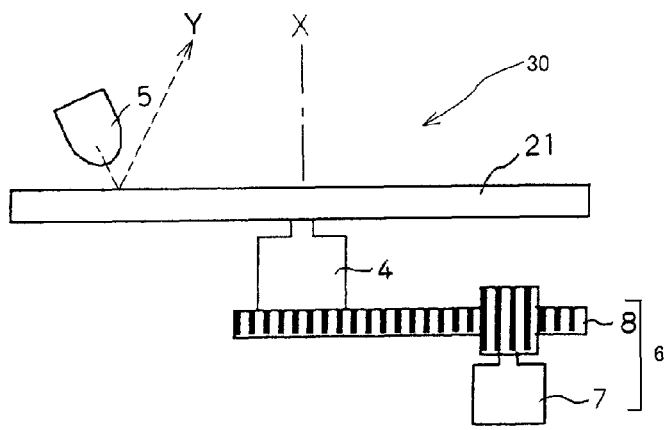
Figure 2C:
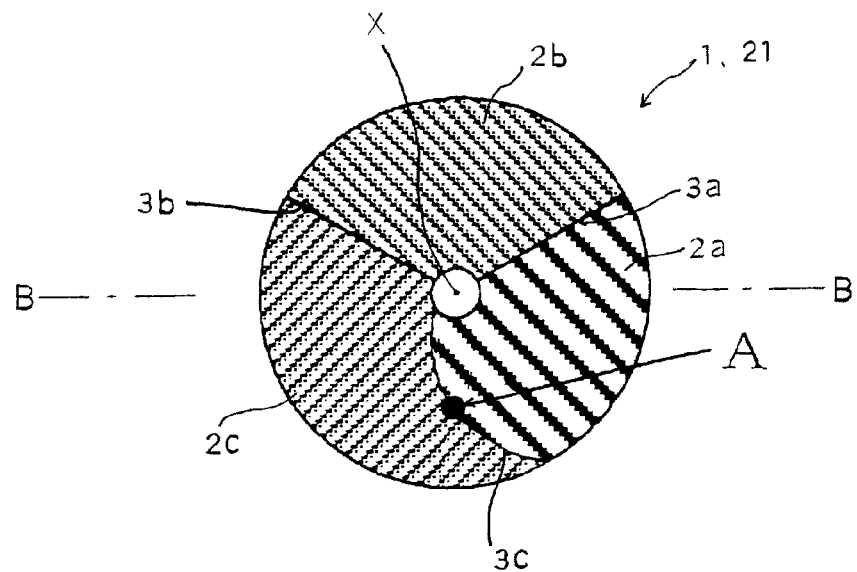
FIG. 2c is a schematic structural view showing a transmission/reflection type phosphor wheel of the transmission and reflection type semiconductor light source apparatuses of FIGS. 2a and 2b.

The disclosed subject matter will now be described in detail with reference to FIGS. 2 to 16b, in which the same or corresponding elements use the same reference marks. FIGS. 2a and 2b are schematic structural views showing a first exemplary embodiment of a transmission type semiconductor light source apparatus and a reflection type semiconductor light source apparatus made in accordance with principles of the disclosed subject matter, respectively. FIG. 2c is a schematic structural view showing a transmission/reflection type phosphor wheel of the transmission and reflection type semiconductor light source apparatuses of FIGS. 2a and 2b.

The transmission type semiconductor light source apparatus 10 can include a semiconductor light source 5 having an optical axis Y and configured to emit ultraviolet light. A phosphor wheel 1 can have a plate shape and a rotation axis X, the plate shaped wheel being substantially perpendicular to the optical axis Y of the semiconductor light source 5. The phosphor wheel 1 can be configured to wavelength-convert the ultraviolet light emitted from the semiconductor light source 5 into white light. A motor 4 can be provided having a rotation axis aligned/connected to the rotation axis X of the phosphor wheel 1 and configured to rotate the phosphor wheel 1 in a plane at a right angle with respect to the rotation axis X of the phosphor wheel 1. A moving module 6 can be provided and configured to adjust a distance between the rotation axis X of the phosphor wheel 1 and an intersection point of the optical axis Y of the semiconductor light source 5 and the phosphor wheel 1.

As the semiconductor light source 5, an LED of InGaN series that emits near-ultraviolet light having a wavelength of approximately 380 nanometers can be used. A laser diode that emits ultraviolet light can also be used as the semiconductor light source 5, as well as other known light source devices.

The phosphor wheel 1 can include: a red phosphor layer 2a wavelength-converting the ultraviolet light emitted from the semiconductor light source 5 into red light; a green phosphor layer 2b wavelength-converting the ultraviolet light into green light; a blue phosphor layer 2c wavelength-converting the ultraviolet light into blue light: a boundary straight line 3a located between the red phosphor layer 2a and the green phosphor layer 2b; a boundary straight line 3b located between the green phosphor layer 2b and the blue phosphor layer 2c; and a boundary curved line 3c located between the blue phosphor layer 2c and the red phosphor layer 2a.

Each of the phosphor layers 2a, 2b and 2c can be made by mixing a phosphor with a transparent resin such as a silicone resin and can be applied on a transparent substrate such as quartz glass substrate by a screen printing method. $CaAlSiN_3$: $Eu^{2+}$, $Ca_2Si_5N_8$:$Eu^{2+}$, $La_2O_2S$:$Eu^{3+}$, $KSiF_6$:$Mn^{4+}$, $KTiF_6$:$Mn^{4+}$ and the like can be used as the phosphor of the red phosphor layer 2a of the phosphor wheel 1. (Si, Al)$_6$ (O, N):$Eu^{2+}$, $BaMgAl_{10}O_{17}$:$Eu^{2+}$ $Mn^{2+}$, (Ba, Sr)$_2SiO_4$:$Eu^{2+}$ and the like can be used as the phosphor of the green phosphor layer 2b. (Sr, Ca, Ba, Mg)$_{10}$(PO$_4$)$_6$C$_{12}$:$Eu^{2+}$, $BaMgAl_{10}O_{17}$:$Eu^{2+}$, LaAl (Si, Al)$_6$ (N, O)$_{10}$:$Ce^{3+}$ can be used as the phosphor of the blue phosphor layer 2c. Of course, other commonly known phosphor materials can be used for each of the above layers.

The boundary curved line 3c can divide the red phosphor layer 2a and the blue phosphor layer 2c so that when considering an imaginary circle centered at the rotation axis X, a ratio of an arc of the imaginary circle that lies within the red phosphor layer 2a to an arc of the imaginary circle that lies within the blue phosphor layer 2c becomes larger as an intersection of the circular arc (i.e., the imaginary circle) and the boundary curved line 3c approaches the rotation axis X. The light source apparatus 10 can change the distance between the intersection of the optical axis Y of the semiconductor light source 5 with the phosphor wheel 1 and the rotation axis X of the phosphor wheel 1 by the moving module 6, and therefore can change a color tone of light emitted from the semiconductor light source 5 via the phosphor wheel 1 when ultraviolet light is emitted from the semiconductor light source 5 and the phosphor layer 1 is rotated.

The moving module 6 can change the distance between the intersection of the optical axis Y of the semiconductor light source 5 with the phosphor wheel 1 and the rotation axis X of the phosphor wheel 1. When the semiconductor light source 5 is fixed, the phosphor wheel 1 can be moved in a direction perpendicular to the rotation axis X by a rack and pinion structure, which can change a rotation motion of a gear motor 7 into a linear motion of a slide gear 8. Accordingly, the light source apparatus 10 can adjust the distance between the intersection of the optical axis Y of the semiconductor light source 5 with the phosphor wheel 1 and the rotation axis X of the phosphor wheel 1 while the phosphor wheel 1 rotates, and which phosphor wheel 1 is located in front of the semiconductor light source 5. In this case, the moving module 6 can be configured by a helicioid method, and also can move the phosphor wheel 1 by a rotation motion including a rotation arm, as compared with the linear motion.

The light source apparatus 10 can emit substantially white light due to an additive color mixture using excited lights by the three phosphor layers 2a, 2b and 2c, which excites the ultraviolet light emitted from the semiconductor light source 5 when rotating the phosphor wheel 1 with the motor 4. When the optical axis Y of the semiconductor light source 5 is located so as to pass through point A shown in FIG. 2c by the moving module 6, because each of the arcs on the phosphor layer 2a, 2b and 2c can be substantially equal, the light source apparatus 10 can emit a normal white light via the phosphor wheel 1.

Here, when the optical axis Y of the semiconductor light source 5 approaches from point A toward the rotation axis X of the phosphor wheel 1 by controlling the moving module 6, the color tone of light emitted from the light source apparatus 10 can change into a warm color including more of a red color than other colors because a ratio of excited red light emitted by the red phosphor layer 2a to excited blue light emitted by the blue phosphor layer 2c increases. On the contrary, when the optical axis Y of the semiconductor light source 5 moves from point A toward a circumference of the phosphor wheel 1 by controlling the moving module 6, the color tone of the light can change into a cool color including a blue color more than the other colors because a ratio of excited blue light by the blue phosphor layer 2c to the red light excited by the red phosphor layer 2a increases. Thus, the semiconductor light source apparatus 10 can continuously change the color tone of the white light from the warm color including a red color to the cool color including a blue color.

Figure 3A:
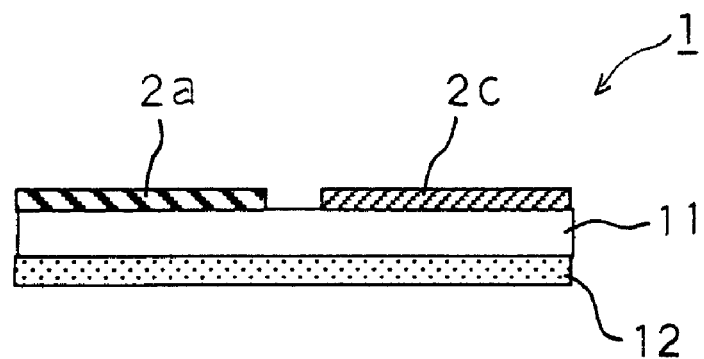
FIGS. 3a and 3b are cross-sectional views depicting cross-sections taken along line B-B of the transmission and reflection type phosphor wheels depicted in FIG. 2c, respectively.
Figure 3B:
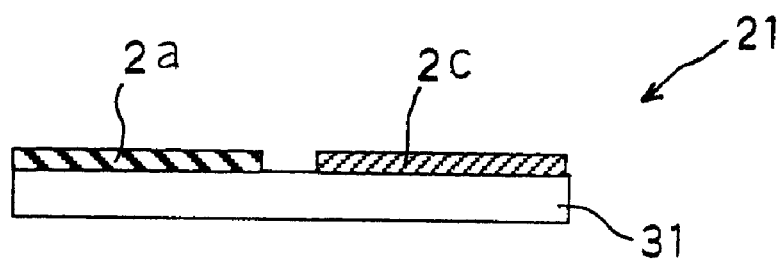

In this case, the above-described transmission type light source apparatus 10 shown in FIG. 2a can illuminate white light emitted from the semiconductor light source 5 in a direction toward a light-emission of the light source apparatus 10 via the phosphor wheel 1. The reflection type light source apparatus 30 shown in FIG. 2b can illuminate white light emitted from the semiconductor light source 5 through a phosphor wheel 21 in a direction toward a light-emission of the light source apparatus 30 by reflecting the white light on the reflection type phosphor wheel 21. FIGS. 3a and 3b are cross-sectional views depicting cross-sections taken along line B-B of the transmission and reflection type phosphor wheels 1 and 21 shown in FIG. 2c, respectively.

In the transmission type phosphor wheel 1, an optical multilayer 12 can be disposed on a whole surface of the transparent substrate 11 so as to face the phosphor layers 2a, 2b and 2c as shown in FIG. 3a. The optical multilayer 12 can transmit the ultraviolet light emitted from the semiconductor light source 5 and can reflect a part of visible light reflected on the phosphor layers 2a, 2b and 2c in the direction toward the light-emission of the light source apparatus 10. Therefore, the transmission type semiconductor light source apparatus 10 can illuminate the white light with high efficiency while it can adjust the color tone of the white light.

The optical multilayer 12 can include a dielectric multilayer that is made by alternatively laminating a high refractive material such as $TiO_2$, $LaTiO$, $Ta_2O_5$, $Nb_2O_5$ and the like and a low refractive material such as $SiO_2$, $MgF_2$ and the like can be used. In the reflection type phosphor wheel 21, the phosphor layers 2a, 2b and 2c can be disposed on a metallic substrate 31 such as an aluminum substrate. Accordingly, the reflection type semiconductor light source apparatus 30 can also illuminate the white light with high efficiency via the metallic substrate 31 while it can adjust the color tone of the white light.

In the above-described light source apparatuses 10 and 30, because the phosphor wheels 1 and 21 can rotate at a high speed, the light excited by the phosphor layers 2a, 2b and 2c can be completely mixed, and therefore the light source apparatuses 10 and 30 can emit a preferable white light. In addition, the phosphor layers 2a, 2b and 2b and the optical multilayer 12 can be efficiently radiated due to a rotation of the phosphor wheel 1. Accordingly, a high power semiconductor light source such as a high power LED can be used as the semiconductor light source 5. Thus, the light source apparatuses 10 and 30 using the high power light semiconductor source can emit white light having a large amount of light intensity while they can continuously adjust a color tone of the white light.

Variation of the first exemplary light source apparatuses 10 and 30 will now be described. A first variation of the first exemplary light source apparatuses 10 and 30 can vary in the semiconductor light source 5 and the phosphor wheels 1 and 21. Accordingly, in the first variation, the semiconductor 5 and phosphor wheels 41 and 61 will now be described in detail with reference to FIGS. 4a, 4b and 4c. As the semiconductor light source 5 of the first variation in the first embodiment, an LED of GaN series that emits blue light having a wavelength of approximately 460 nanometers can be used, and also a laser diode that emits blue light can be used, for example.

Figure 4A:
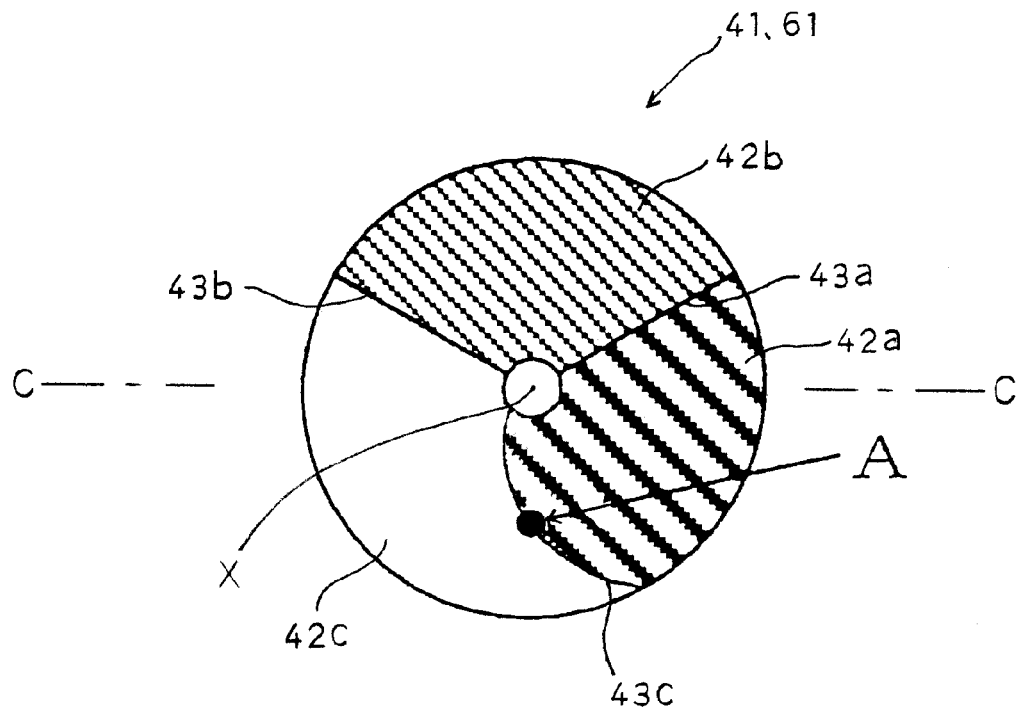
FIG. 4a is a schematic structural view showing a transmission/reflection type phosphor wheel of a first variation of the first exemplary semiconductor light source apparatuses.
Figure 4B:
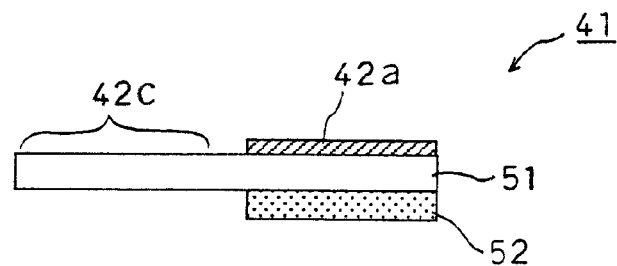
FIGS. 4b and 4c are cross-sectional views depicting cross-sections taken along line C-C of the transmission and reflection type phosphor wheels depicted in FIG. 4a, respectively.
Figure 4C:
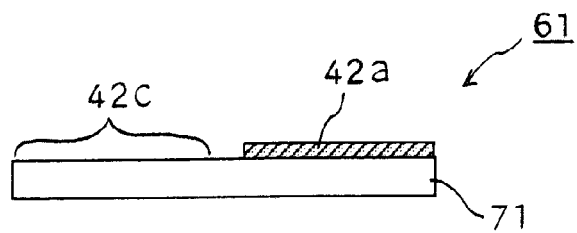

FIG. 4a is a schematic structural view showing a transmission/reflection type phosphor wheel of the first variation of the first exemplary semiconductor light source apparatuses, and FIGS. 4b and 4c are cross-sectional views depicting cross-sections taken along line C-C of the transmission and reflection type phosphor wheels depicted in FIG. 4a, respectively.

The transmission type phosphor wheel 41 can include: a red phosphor layer 42a wavelength-converting the blue light emitted from the semiconductor light source 5 into red-purple light; a green phosphor layer 42b wavelength-converting the blue light into blue-green light; a transparent region 42c transmitting the blue light emitted from the semiconductor light source 5 without change of wavelength: a boundary straight line 43a located between the red phosphor layer 42a and the green phosphor layer 42b; a boundary straight line 43b located between the green phosphor layer 2b and the transparent region 42c; and a boundary curved line 43c located between the transparent region 42c and the red phosphor layer 42a.

Each of the phosphor layers 42a and 42b can be made by mixing a phosphor with a transparent resin such as a silicone resin and can be applied on a transparent substrate 51 such as quartz glass substrate by a screen printing method. $CaAlSiN_3$: $Eu^{2+}$, $Ca_2Si_5N_8$:$Eu^{2+}$, $La_2O_2S$:$Eu^{3+}$, $KSiF_6$:$Mn^{4+}$, $KTiF_6$: $Mn^{4+}$ and the like can be used as the phosphor of the red phosphor layer 42a of the phosphor wheels 41 and 61. $Y_3(Ga,Al)_5O_{12}$:$Ce^{3+}$, $Ca_3Sc_2Si_3O_{12}$:$Ce^{3+}$, $CaSc_2O_4$:$Eu^{2+}$, $(Ba,Sr)_2SiO_4$:$Eu^{2+}$, $Ba_3Si_6O_{12}N_2$:$Eu^{2+}$, $(Si,Al)_6(O,N)$:$Eu^{2+}$ and the like can be used as the phosphor of the green phosphor layer 42b. In the transparent region 42c, the transparent substrate 51 can be exposed from the red and green phosphor layers 42a and 42b.

The boundary curved line 43c can divide the red phosphor layer 42a and the transparent region 42c so that a ratio of an arc on the red phosphor layer 4a to an arc on the transparent region 42c becomes larger as an intersection of the arc and the boundary curved line 43c approaches the rotation axis X of the phosphor wheel 41 when each arc is part of an imaginary circle centered at the rotation axis X of the phosphor wheel 41 as shown in FIG. 4a. The light source apparatus 10 including the phosphor wheel 41 can also change the distance between the intersection of the optical axis Y of the semiconductor light source 5 and the phosphor wheel 41 and the rotation axis X of the phosphor wheel 41 by controlling the moving module 6, and therefore can also change a color tone of white light emitted from the semiconductor light source 5 through the phosphor wheel 1 like the semiconductor light source apparatus 10 of the first embodiment.

The semiconductor light source apparatus 10 including the phosphor wheel 41 can emit substantially white light due to an additive color mixture of the blue light emitted from the semiconductor light source 5 and excited red-purple and blue-green lights by the two phosphor layers 42a and 42c, which excite the blue light by rotating the phosphor wheel 1 with respect to the rotation axis X by the motor 4. When the optical axis Y of the semiconductor light source 5 is located so as to pass through point A shown in FIG. 4a by controlling the moving module 6, because each of arcs on the red and green phosphor layers 42a and 4b and the transparent region 42c can substantially equal, the semiconductor light source apparatus 10 can emit a normal white light via the phosphor wheel 41.

In this case, when the optical axis Y of the semiconductor light source 5 approaches from point A toward the rotation axis X of the phosphor wheel 41 by controlling the moving module 6, the color tone of the white light emitted from the light source apparatus 10 can change into a warm color including a red color more than other colors because a ratio of the red-purple light excited by the red phosphor layer 42a to the blue light transmitted by the transparent region 42c for transmitting the blue light increases.

On the contrary, when the optical axis Y of the semiconductor light source 5 moves from point A toward a circumference of the phosphor wheel 41 by controlling the moving module 6, the color tone of the white light can change into a cool color including a blue color more than the other colors because a ratio of the blue light transmitted by the transparent region 42c for transmitting the blue light to the red-purple light excited by the red phosphor layer 42a for converting into the red-purple light increases. Therefore, the semiconductor light source 10 including the phosphor wheel 41 can also change the color tone of the white light continuously from the warm color to the cool color.

In the transmission type phosphor wheel 41, an optical multilayer 52 can be disposed on a surface of the transparent substrate 51 so as to face the red and green phosphor layers 42a and 42b as shown in FIG. 4b. The optical multilayer 52 can transmit the blue light emitted from the semiconductor light source 5 and can also reflect the excited red-purple and blue-green lights reflected on the phosphor layers 42a and 42b in a direction toward the light-emission of the light source apparatus 10. Therefore, the transmission type semiconductor light source apparatus 10 including the phosphor wheel 41 can illuminate the white light with high efficiency by completely mixing the red-purple, blue-green and blue lights while it can adjust the color tone of the white light.

As the optical multilayer 52, a dielectric multilayer that is made by alternatively laminating a high refractive material such as $TiO_2$, LaTiO, $Ta_2O_5$, $Nb_2O_5$ and the like and a low refractive material such as $SiO_2$, $MgF_2$ and the like can be used. In the reflection type phosphor wheel 61, the phosphor layers 42a and 42b can be disposed on a metallic substrate 71 such as an aluminum substrate. Consequently, the reflection type semiconductor light source apparatus 30 including the phosphor wheel 61 can also illuminate the white light with high efficiency by completely reflecting and mixing the red-purple, blue-green and blue lights while it can adjust the color tone of the white light. Thus, the respective light source apparatuses 10 and 30 including the phosphor wheels 41, 61 and a high power blue LED can also emit white light having a large amount of light intensity while they can continuously adjust a color tone of the white light.

A second variation of the first exemplary light source apparatuses 10 and 30 can vary in the semiconductor light source 5 and the phosphor wheels 1 and 21 from the first embodiment. Accordingly, in the second variation of the first embodiment, the semiconductor 5 and phosphor wheels 78 and 80 will now be described in detail with reference to FIGS. 5a, 5b and 5c. As the semiconductor light source 5 of the second variation, an LED of GaN series that emits blue light having a wavelength of approximately 460 nanometers can be used, and also a laser diode that emits blue light can be used.

Figure 5A:
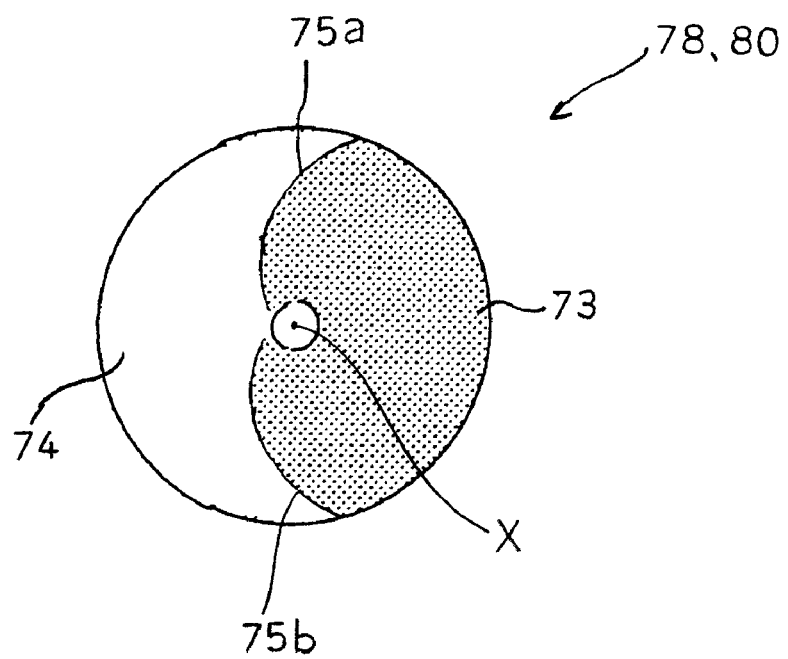
FIG. 5a is a schematic structural view showing a transmission/reflection type phosphor wheel of a second variation of the first exemplary semiconductor light source apparatuses.
Figure 5B:
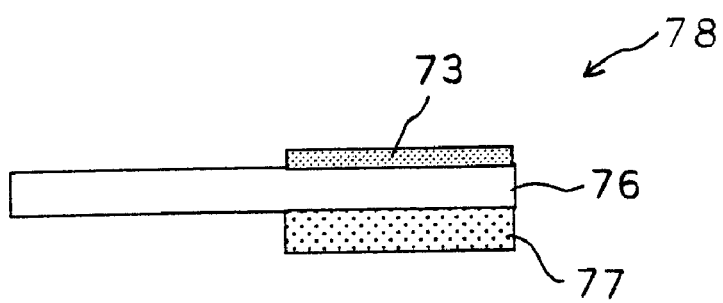
FIGS. 5b and 5c are cross-sectional views of the transmission and reflection type phosphor wheels depicted in FIG. 5a, respectively.
Figure 5C:
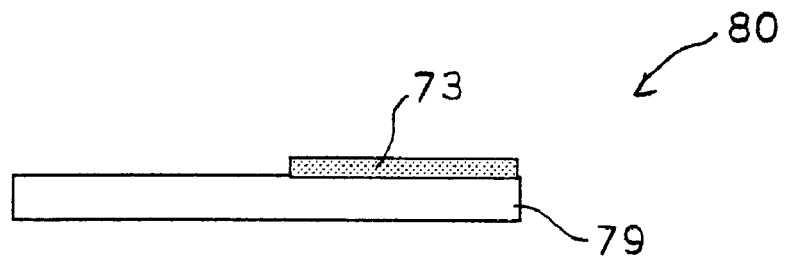

FIG. 5a is a schematic structural view showing a transmission/reflection type phosphor wheel of a second variation of the first exemplary semiconductor light source apparatuses, and FIGS. 5b and 5c are cross-sectional views of the transmission and reflection type phosphor wheels depicted in FIG. 5a, respectively. The transparent type phosphor wheel 78 can include: a yellow phosphor layer 73 wavelength-converting the blue light emitted from the semiconductor light source 5 into white light; a transparent region 74 transmitting the blue light without change of wavelength: and boundary curved line 75a and 75b located between the transparent region 74 and the yellow phosphor layer 73.

The yellow phosphor layer 73 can be made by mixing a yellow phosphor with a transparent resin such as a silicone resin and can be applied on a transparent substrate 76 such as quartz glass substrate by the screen printing method. $Y_3Al_5O_{12}:Ce^{3+}$ (YAG), $(Sr, Ba)_2SiO_4:Eu^{2+}$, $Ca_x(Si,Al)_{12}(O,N)_{16}:Eu^{2+}$ and the like can be used as the yellow phosphor of the yellow phosphor layer 73. The boundary curved lines 75a and 75b can divide the yellow phosphor layer 73 and the transparent region 74 so that a ratio of an arc on the yellow phosphor layer 73 to an arc on the transparent region 74 becomes larger as an intersection of the arc and the boundary curved line 75a approaches the rotation axis X of the phosphor wheel 78 when each arc is part of an imaginary circle centered at the rotation axis X of the phosphor wheel 78.

The transparent type semiconductor light source apparatus 10 including the phosphor wheel 78 can also change the distance between the intersection of the optical axis Y of the semiconductor light source 5 and the phosphor wheel 78 and the rotation axis X of the phosphor wheel 78 by controlling the moving module 6. Therefore, the semiconductor light source apparatus 10 can also change a color tone of white light emitted from the semiconductor light source 5 via the phosphor wheel 78 like the first exemplary semiconductor light source apparatus 10.

The semiconductor light source apparatus 10 including the phosphor wheel 78 can emit substantially white light due to an additive color mixture of the blue light emitted from the semiconductor light source 5 and the excited light by the yellow phosphor layers 73 by rotating the phosphor wheel 1 at a substantially right angle to the optical axis Y of the semiconductor light source 5 with the motor 4.

In this case, when the optical axis Y of the semiconductor light source 5 approaches the rotation axis X of the phosphor wheel 78 by controlling the moving module 6, the color tone of the white light emitted from the semiconductor light source apparatus 10 can change into a warm color including a yellow color more than other colors because a ratio of the excited light by the yellow phosphor layer 73 to the blue light transmitted by the transparent region 74 increases.

On the contrary, when the optical axis Y of the semiconductor light source 5 moves toward a circumference of the phosphor wheel 78 by controlling the moving module 6, the color tone of the white light can change into a cool color including a blue color more than the other colors because a ratio of the blue light transmitted by the transparent region 74 to the excited light excited by the yellow phosphor layer 73 increases.

In the transmission type phosphor wheel 78, an optical multilayer 77 can be disposed on a surface of the transparent substrate 76 so as to face the yellow phosphor layer 73 as shown in FIG. 5b. The optical multilayer 77 can transmit the blue light having a short wavelength and can also reflect the excited lights reflected on the yellow phosphor layer 73 in a direction toward the light-emission of the semiconductor light source apparatus 10.

Therefore, the transmission type semiconductor light source apparatus 10 including the phosphor wheel 78 can illuminate the white light with high efficiency by mixing the blue light and the excited light excited by the yellow phosphor layer 73 while it can continuously adjust the color tone of the white light. As the optical multilayer 77, the dielectric multilayer that is made by alternatively laminating the high refractive material such as $TiO_2$, LaTiO, $Ta_2O_5$, $Nb_2O_5$ and the like and the low refractive material such as $SiO_2$, $MgF_2$ and the like can be used. In the reflection type phosphor wheel 80, the yellow phosphor layers 73 can be disposed on a metallic substrate 79 such as an aluminum substrate.

Accordingly, the reflection type semiconductor light source apparatus 30 including the phosphor wheel 80 can also illuminate the white light with high efficiency via the metallic substrate 79 while it can adjust the color tone of the white light. Thus, the respective light source apparatuses 10 and 30 including the phosphor wheels 78, 80 and a high power blue LED can also emit white light having a large amount of light intensity while they can continuously adjust a color tone of the white light from the warm color to the cool color.

Figure 6A:
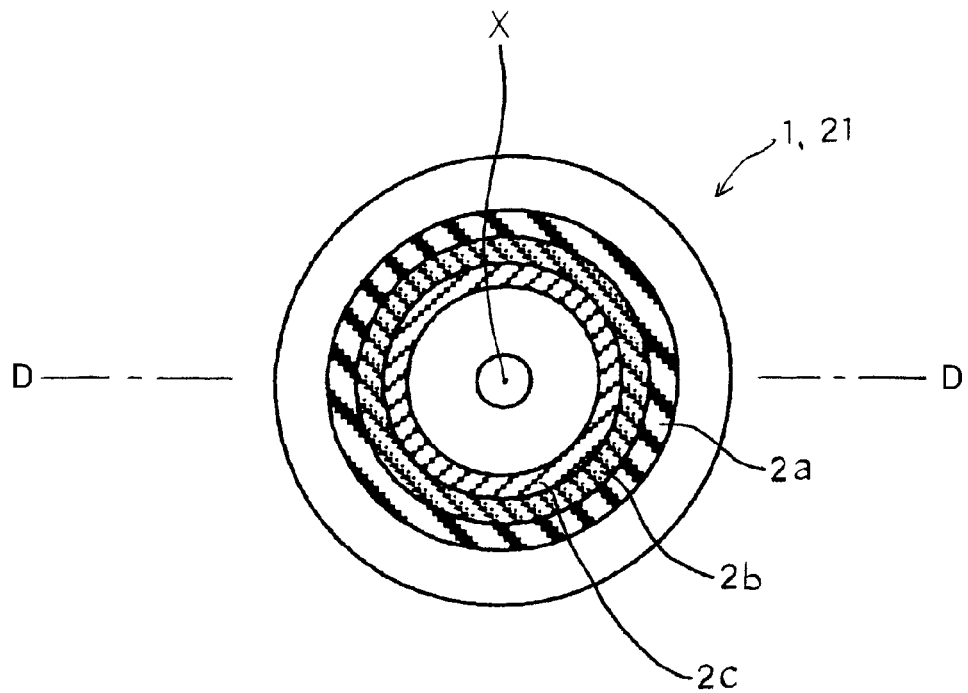
FIG. 6a is a schematic structural view showing a transmission/reflection type phosphor wheel of a second exemplary embodiment of the transmission/reflection type semiconductor light source apparatus made in accordance with principles of the disclosed subject matter.
Figure 6B:
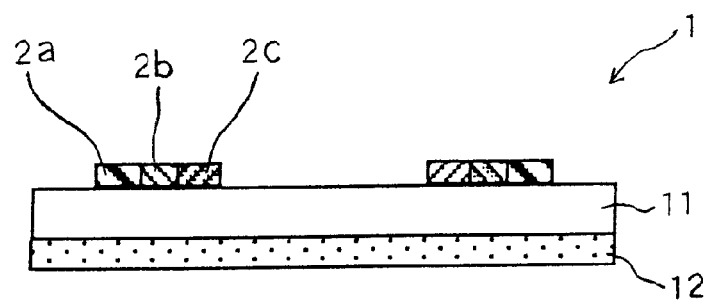
FIGS. 6b and 6c are cross-sectional views depicting cross-sections taken along line D-D of the transmission and reflection type phosphor wheels shown in FIG. 6a, respectively.
Figure 6C:
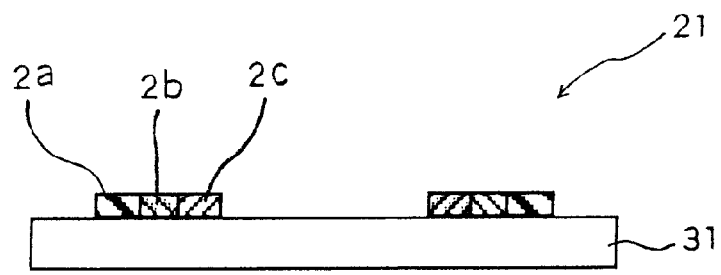

A set of second exemplary embodiments of the semiconductor light source apparatuses made in accordance with the disclosed subject matter will now be described. A difference between the first exemplary light source apparatuses 10 and 30 and the second exemplary light source apparatuses relate to a structure of the phosphor wheels 1 and 21. Accordingly, the phosphor wheels 1 and 21 will now be described in detail with reference to FIGS. 6a, 6b and 6c. FIG. 6a is a schematic structural view showing a transmission/reflection type phosphor wheel of the second exemplary semiconductor light source apparatuses, and FIGS. 6b and 6c are cross-sectional views depicting cross-sections taken along line D-D of the transmission and reflection type phosphor wheels depicted in FIG. 6a, respectively.

The transmission type phosphor wheel 1 can include: the red phosphor layer 2a formed in a substantially circular or concentric shape and the red phosphor layer 2a configured to wavelength-convert the ultraviolet light emitted from the semiconductor light source 5 into red light; the green phosphor layer 2b formed in a concentric shape so as to be adjacent to the red phosphor layer 2a and the green phosphor layer 2b configured to wavelength-convert the ultraviolet light into green light; and the blue phosphor layer 2c formed in a concentric shape so as to be adjacent to the green phosphor layer 2b and the blue phosphor layer 2c wavelength-converting the ultraviolet light into blue light.

Each of the phosphor layers 2a, 2b and 2c can be made by mixing a phosphor with a transparent resin such as a silicone resin and can be applied on a transparent substrate such as quartz glass substrate by the screen printing method. $CaAlSiN_3:Eu^{2+}$, $Ca_2Si_5N_8:Eu^{2+}$, $La_2O_2S:Eu^{3+}$, $KSiF_6:Mn^{4+}$, $KTiF_6:Mn^{4+}$ and the like can be used as the phosphor of the red phosphor layer 2a. $(Si, Al)_6(O, N):Eu^{2+}$, $BaMgAl_{10}O_{17}:Eu^{2+}$ $Mn^{2+}$, $(Ba, Sr)_2SiO_4:Eu^{2+}$ and the like can be used as the phosphor of the green phosphor layer 2b. $(Sr, Ca, Ba, Mg)_{10}(PO_4)_6C_{12}:Eu^{2+}$, $BaMgAl_{10}O_{17}:Eu^{2+}$, $LaAl(Si, Al)_6(N, O)_{10}:Ce^{3+}$ can be used as the phosphor of the blue phosphor layer 2c.

Figure 7:
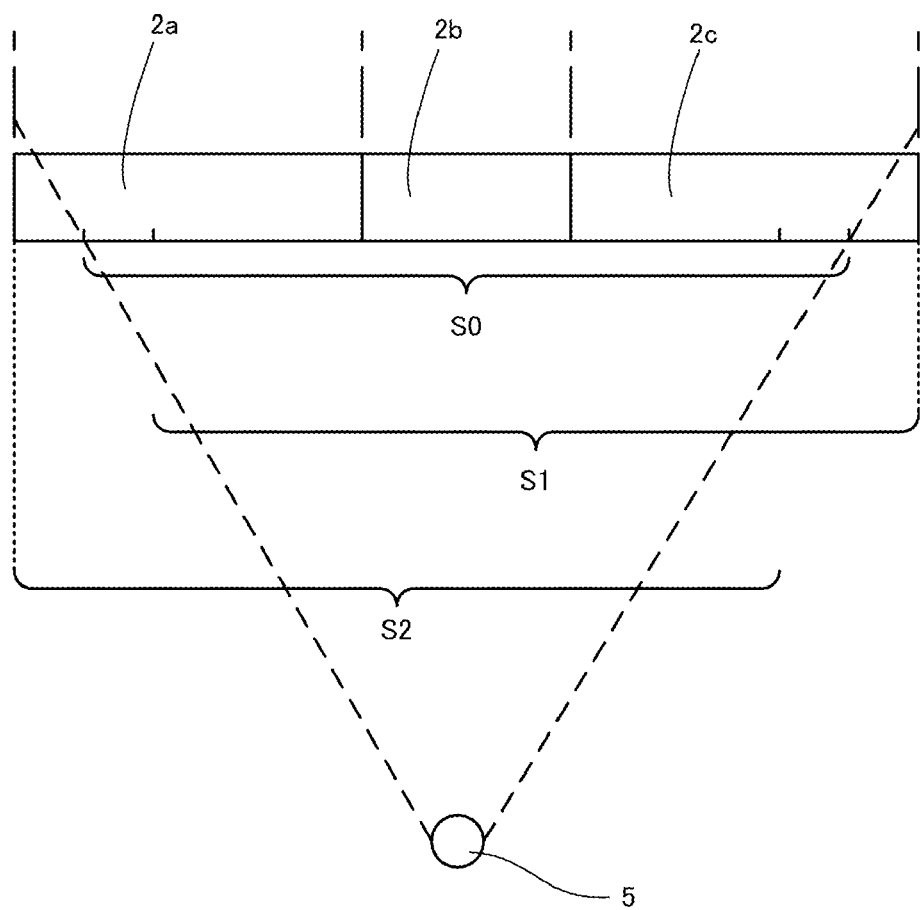
FIG. 7 is an explanatory diagram showing a relation between a semiconductor light source and a phosphor layer in the second exemplary embodiment of the semiconductor light source apparatuses.

FIG. 7 is an explanatory diagram showing a relation between the semiconductor light source 5 and the phosphor layers 2a, 2b and 2c in the second exemplary semiconductor light source apparatuses. The semiconductor light source apparatus 10 can emit substantially white light due to an additive color mixture of excited lights using the three phosphor layers 2a, 2b and 2c by rotating the phosphor wheel 1 at a substantially right angle to the optical axis Y of the semiconductor light source 5 with the motor 4.

When a light-emitting area of the semiconductor light source 5 is located so as to illuminate an area S0 shown in FIG. 7, because each light-emitting area of the phosphor layers 2a, 2b and 2c can be substantially equal, the semiconductor light source apparatus 10 can emit a normal white light via the phosphor wheel 1. Here, when the optical axis Y of the semiconductor light source 5 approaches the rotation axis X of the phosphor wheel 1 by controlling the moving module 6, the color tone of the white light emitted from the light source apparatus 10 can change into a cool color including more blue color than other colors because a ratio of the blue light excited by the blue phosphor layer 2c to the red light excited by the red phosphor layer 2a increases as shown by mark S1 in FIG. 7.

On the contrary, when the optical axis Y of the semiconductor light source 5 moves toward the circumference of the phosphor wheel 1 by controlling the moving module 6, the color tone of the white light can change into a warm color including more red color than the other colors because a ratio of the red light excited by the red phosphor layer 2a to the blue light excited by the blue phosphor layer 2c increases.

In the transmission type phosphor wheel 1, the optical multilayer 12 can be disposed on a whole surface of the transparent substrate 11 so as to face the phosphor layers 2a, 2b and 2c as shown in FIG. 6b. The optical multilayer 12 can transmit the ultraviolet light emitted from the semiconductor light source 5 and can also reflect the excited lights reflected on the phosphor layers 2a, 2b and 2c in a direction toward the light-emission of the light source apparatus 10. Therefore, the transmission type semiconductor light source apparatus 10 can illuminate the white light with high efficiency while it can adjust the color tone of the white light.

The optical multilayer 12 can include a dielectric multilayer that is made by alternatively laminating a high refractive material such as $TiO_2$, $LaTiO$, $Ta_2O_5$, $Nb_2O_5$ and the like and a low refractive material such as $SiO_2$, $MgF_2$ and the like can be used. In the reflection type phosphor wheel 21, the phosphor layers 2a, 2b and 2c can be disposed on the metallic substrate 31 such as an aluminum substrate. Accordingly, the reflection type semiconductor light source apparatus 30 can also illuminate the white light with high efficiency while it can adjust the color tone of the white light.

In the second exemplary semiconductor light sources 10 and 30, each of the phosphor layers 2a, 2b and 2c can be formed in a circular doughnut shape. However, each of the phosphor layers 2a, 2b and 2c can be formed in an ellipsoidal doughnut shape. In this case, the three lights excited by the phosphor layers 2a, 2b and 2c can mix better than those by the phosphor layers 2a, 2b and 2c, which are formed in a concentric circular shape. Thus, the second exemplary semiconductor light source apparatuses 10 and 30 can also emit white light having a large amount of light intensity while they can continuously adjust a color tone of the white light from the warm color to the cool color.

Variation of the second exemplary light source apparatuses 10 and 30 will now be described. A first variation of the second exemplary light source apparatuses 10 and 30 can vary with respect to the semiconductor light source 5 and the phosphor wheels 1 and 21 from the second embodiment. Accordingly, in the first variation of the second embodiment, the semiconductor 5 and phosphor wheels 41 and 61 will now be described in detail. As the semiconductor light source 5 of the first variation in the second embodiment, an LED of GaN series that emits blue light having a wavelength of approximately 460 nanometers can be used, and also a laser diode that emits blue light can be used, among other types of light sources.

Figure 8A:
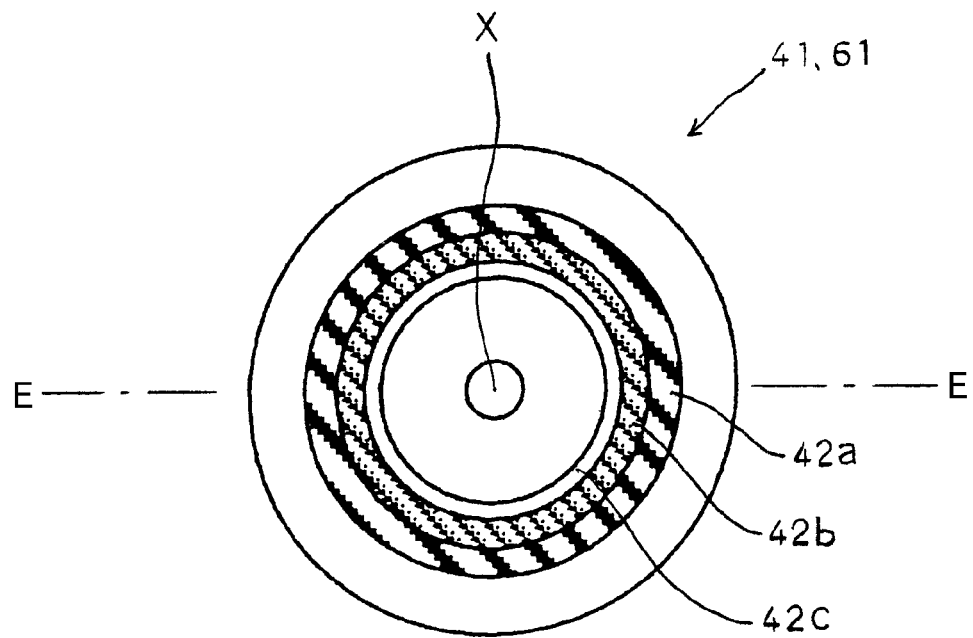
FIG. 8a is a schematic structural view showing a transmission/reflection type phosphor wheel of a first variation of the second exemplary semiconductor light source apparatuses.
Figure 8B:
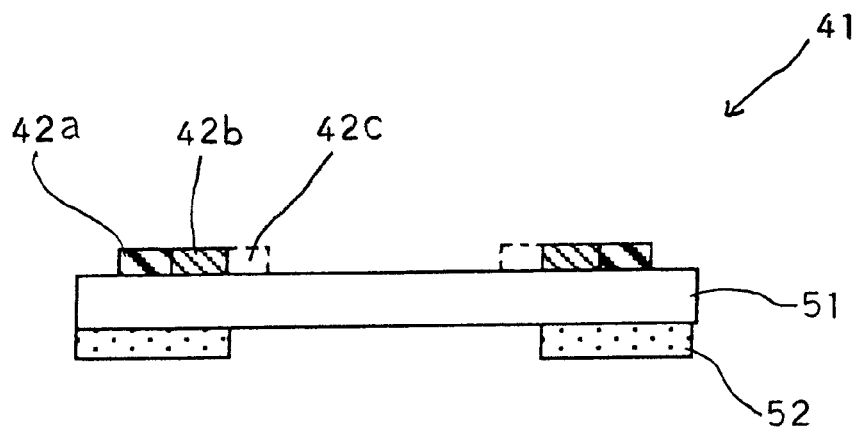
FIGS. 8b and 8c are cross-sectional views depicting cross-sections taken along line E-E of the transmission and reflection type phosphor wheels depicted in FIG. 8a, respectively.
Figure 8C:
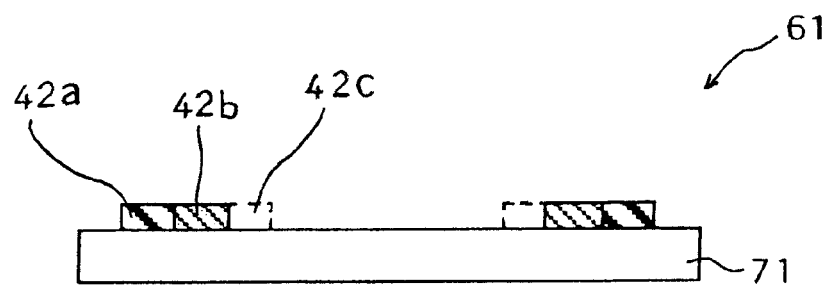

FIG. 8a is a schematic structural view showing a transmission/reflection type phosphor wheel of a first variation of the second exemplary semiconductor light source apparatuses, and FIGS. 8b and 8c are cross-sectional views depicting cross-sections taken along line E-E of the transmission and reflection type phosphor wheels depicted in FIG. 8a, respectively.

The transparent type phosphor wheel 41 can include: the red phosphor layer 42a formed in a concentric shape and the red phosphor layer 42a wavelength-converting the blue light emitted from the semiconductor light source 5 into red-purple light; the green phosphor layer 42b located adjacent to the red phosphor layer 42a in a concentric shape and the green phosphor layer 42b wavelength-converting the blue light into blue-green light; and the transparent region 42c located adjacent to the green phosphor layer 42b in a concentric shape and the transparent region 42c transmitting the blue light emitted from the semiconductor light source 5 without change of wavelength.

Each of the red and green phosphor layers 42a and 42b can be made by mixing a phosphor with a transparent resin such as a silicone resin and can be applied on the transparent substrate 51 such as quartz glass substrate by the screen printing method. $CaAlSiN_3:Eu^{2+}$, $Ca_2Si_5N_8:Eu^{2+}$, $La_2O_2S:Eu^{3+}$, $KSiF_6:Mn^{4+}$, $KTiF_6:Mn^{4+}$ and the like can be used as the phosphor of the red phosphor layer 42a of the transmission and reflection type phosphor wheels 41 and 61. $Y_3(Ga, Al)_5O_{12}:Ce^{3+}$, $Ca_3Sc_2Si_3O_{12}:Ce^{3+}$, $CaSc_2O_4:Eu^{2+}$, $(Ba, Sr)_2SiO_4:Eu^{2+}$, $Ba_3Si_6O_{12}N_2:Eu^{2+}$, $(Si, Al)_6(O, N):Eu^{2+}$ and the like can be used as the phosphor of the green phosphor layer 42b.

In the transparent region 42c of the transparent type phosphor wheel 41, the transparent substrate 51 can be exposed from the phosphor layers 42a and 42b. Similarly, in the regard to the transparent region 42c of the reflection type phosphor wheel 61, the metallic substrate 71 can be exposed from the red and green phosphor layers 42a and 42b.

Figure 9:
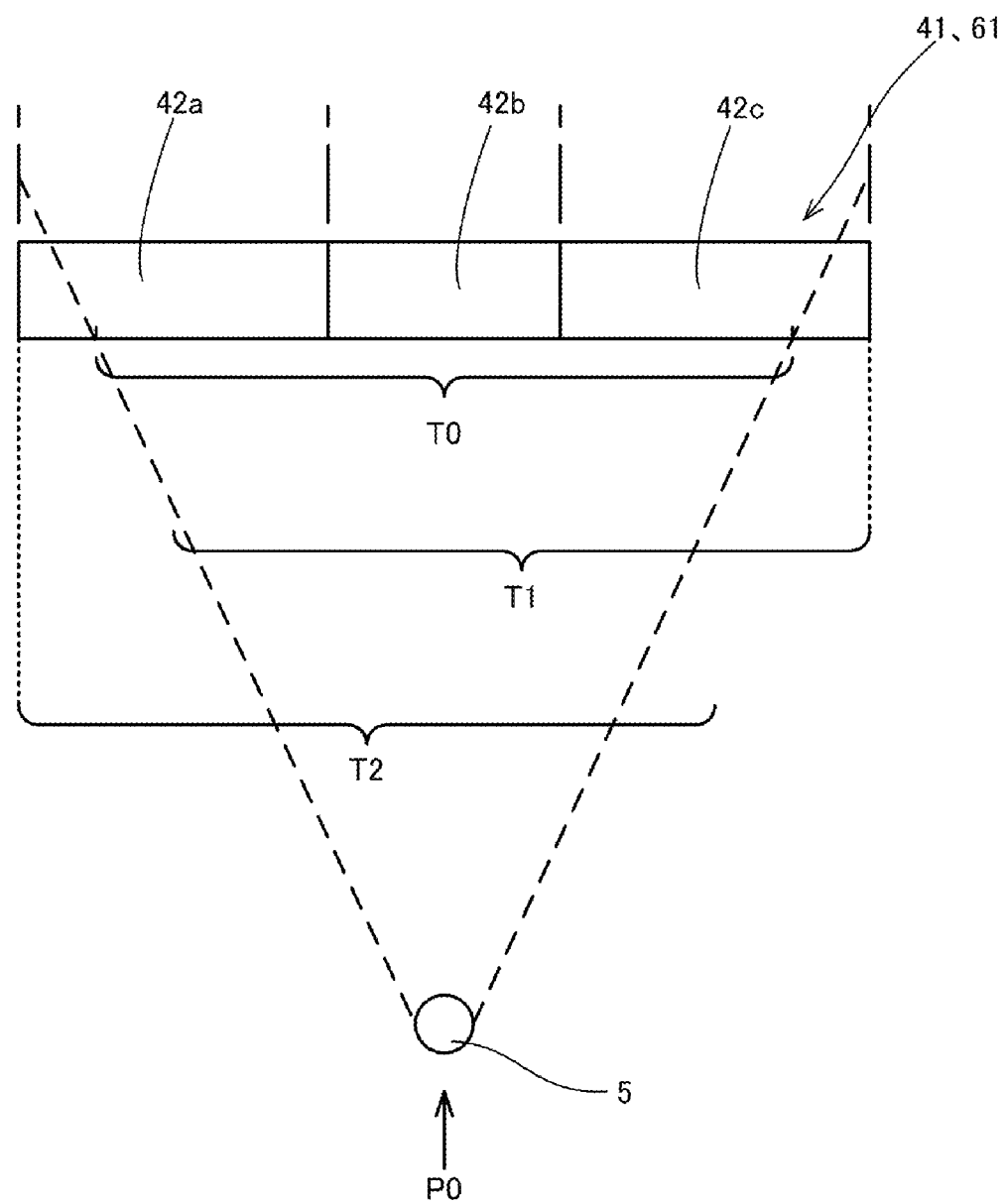
FIG. 9 is an explanatory diagram showing a relation between the semiconductor light source and a phosphor layer in the first variation of the second exemplary semiconductor light source apparatuses.

FIG. 9 is an explanatory diagram showing a relation between the semiconductor light source 5 and the phosphor layers 42a and 42b and the transparent region 42c in the first variation of the second exemplary semiconductor light source apparatuses. When the semiconductor light source 5 emit the blue light from a direction P0 so that the optical axis Y thereof is located substantially perpendicular to the phosphor wheel 41, the semiconductor light source apparatus 10 can emit substantially white light due to an additive color mixture of the blue light transmitted from the transparent region 42c and the red-purple and blue-green lights excited by the two phosphor layers 42a and 42b by rotating the phosphor wheel 1 with respect to the rotation axis X by the motor 4.

Consequently, when a light-emitting area of the semiconductor light source 5 is located so as to illuminate a light-emitting area T0 shown in FIG. 9, the semiconductor light source apparatus 10 including the phosphor wheel 41 can emit a normal white light via the phosphor wheel 41. In this case, when the optical axis Y of the semiconductor light source 5 approaches the rotation axis X of the phosphor wheel 41 by controlling the moving module 6, the color tone of the white light emitted from the semiconductor light source apparatus 10 can change into a cool color including a blue color more than other colors because a ratio of the blue light transmitted from the transparent region 42c to the red-purple light excited by the red phosphor layer 42a increases as shown by mark T1 in FIG. 9.

On the contrary, when the optical axis Y of the semiconductor light source 5 moves toward the circumference of the phosphor wheel 41 by controlling the moving module 6, the color tone of the white light can change into a warm color including a red color more than the other colors because a ratio of the red-purple light excited by the red phosphor layer 42a to the blue light transmitted from the transparent region 42c increases.

In the transmission type phosphor wheel 41, the optical multilayer 52 can be disposed on a surface of the transparent substrate 51 so as to face the phosphor layers 42a and 42b as shown in FIG. 8b. The optical multilayer 52 can transmit the blue light emitted from the semiconductor light source 5 and can also reflect the excited lights reflected on the phosphor layers 42a and 42b in a direction toward the light-emission of the semiconductor light source 10. Therefore, the transmission type semiconductor light source apparatus 10 can illuminate the white light with high efficiency by completely mixing the blue light and the excited red-purple and blue-green lights while it can adjust the color tone of the white light.

As the optical multilayer 52, the dielectric multilayer that is made by alternatively laminating the high refractive material such as $TiO_2$, LaTiO, $Ta_2O_5$, $Nb_2O_5$ and the like and the low refractive material such as $SiO_2$, $MgF_2$ and the like can be used. In the reflection type phosphor wheel 61, the phosphor layers 42a and 42b can be disposed on the metallic substrate 71 such as an aluminum substrate. Accordingly, the reflection type semiconductor light source apparatus 30 can also illuminate the white light with high efficiency by completely reflecting and mixing the blue light and the excited red-purple and blue-green lights while it can adjust the color tone of the white light.

Figure 10A:
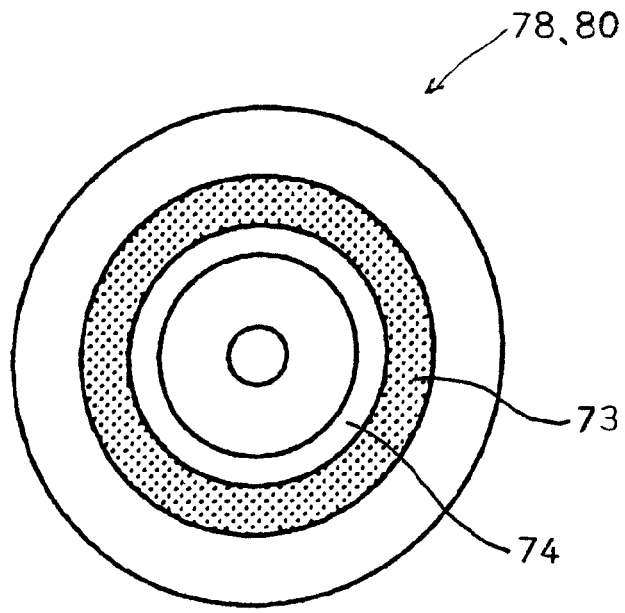
FIG. 10a is a schematic structural view showing a transmission/reflection type phosphor wheel of a second variation of the second exemplary semiconductor light source apparatuses.
Figure 10B:
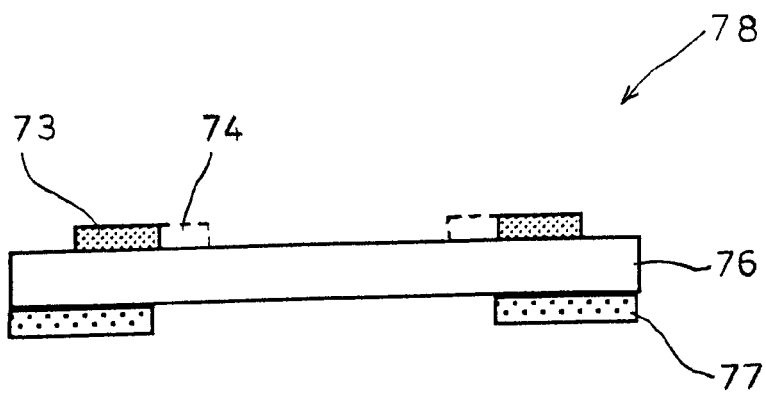
FIGS. 10b and 10c are cross-sectional views of the transmission and reflection type phosphor wheels depicted in FIG. 10a, respectively.
Figure 10C:
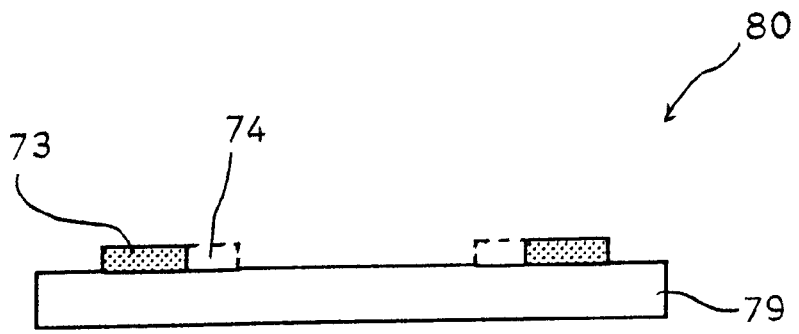

A second variation of the second exemplary light source apparatuses 10 and 30 can vary in the phosphor wheels 41 and 61 from the immediately above-described first variation. Accordingly, in this second variation of the second embodiment, phosphor wheels 78 and 80 will now be described in detail with reference to FIGS. 10a, 10b and 10c. FIG. 10a is a schematic structural view showing the transmission/reflection type phosphor wheel of the second variation of the second exemplary semiconductor light source apparatuses, and FIGS. 10b and 10c are cross-sectional views of the transmission and reflection type phosphor wheels depicted in FIG. 10a, respectively.

The transmission type phosphor wheel 78 can include a yellow phosphor layer 73 formed in a concentric, which wavelength-converts the blue light emitted from the semiconductor light source 5 into white light. In addition, the phosphor wheel 78 can include a transparent region 74 for transmitting the blue light without change of wavelength, which is located adjacent to the yellow phosphor layer 73 in a concentric shape.

The phosphor layer 73 can be applied on a transparent substrate 76 such as quartz glass substrate by the screen printing method. $Y_3Al_5O_{12}:Ce^{3+}$ (YAG), $(Sr, Ba)_2 SiO_4:Eu^{2+}$, $Ca_x (Si, Al)_{12} (O, N)_{16}:Eu^{2+}$ and the like can be used as a phosphor of the yellow phosphor layer 73, which is made by mixing the phosphor with a transparent resin such as a silicone resin, epoxy resin, etc. The semiconductor light source apparatus 10 including the phosphor wheel 78 can emit substantially white light due to an additive color mixture using the blue light emitted from the semiconductor light source 5 and the yellow phosphor layers 73 by rotating the phosphor wheel 1 at a substantially right angle to the optical axis Y of the semiconductor light source 5 by the motor 4.

In this case, when the optical axis Y of the semiconductor light source 5 approaches the rotation axis X of the phosphor wheel 78 by controlling the moving module 6, the color tone of the white light emitted from the light source apparatus 10 can change into a cool color including a blue color because a ratio of the blue light transmitted from the transparent region 74 to the white light excited by the yellow phosphor layer 7 increases.

On the contrary, when the optical axis Y of the semiconductor light source 5 moves toward the circumference of the phosphor wheel 78 by controlling the moving module 6, the color tone of the white light can change into a warm color including a yellow-white color because a ratio of the yellow-white light excited by the yellow phosphor layer 73 to the blue light transmitted from the transparent region 73 increases.

In the transmission type phosphor wheel 78, the optical multilayer 77 can be disposed on a surface of the transparent substrate 76 so as to face the yellow phosphor layer 73 as shown in FIG. 10b. The optical multilayer 77 can transmit the blue light emitted from the semiconductor light source 5 and can also reflect the excited white light reflected on the yellow phosphor layers 73 in a direction toward the light-emission of the semiconductor light source apparatus 10. Therefore, the transmission type semiconductor light source apparatus 10 including the phosphor wheel 78 and a high power blue LED can illuminate the white light having a large amount of light intensity with high efficiency while it can continuously adjust the color tone of the white light from the cool color to the warm color.

As the optical multilayer 77, the dielectric multilayer that is made by alternatively laminating the high refractive material such as $TiO_2$, LaTiO, $Ta_2O_5$, $Nb_2O_5$ and the like and the low refractive material such as $SiO_2$, $MgF_2$ and the like can be used. In the reflection type phosphor wheel 80, the yellow phosphor layers 73 can be disposed on a metallic substrate 79 such as an aluminum substrate. Accordingly, the reflection type semiconductor light source apparatus 30 including the phosphor wheel 80 can also illuminate the white light with high efficiency while it can continuously adjust the color tone of the white light from the cool color to the warm color.

In the above-described second exemplary semiconductor light source apparatuses 10 and 30, each of phosphor layers and the transparent region can be located in a concentric shape. Accordingly, the color breakup cannot occur as compared with the conventional light source apparatus including a phosphor wheel. Especially, because the second variation of the second embodiment can be constructed by one yellow phosphor layer formed in a concentric shape, the color breakup cannot occur. Thus, the second exemplary semiconductor light source apparatuses 10 and 30 can emit white light having a large amount of light intensity and a preferable light distribution while they can continuously adjust a color tone of the white light from the warm color to the cool color.

Third exemplary embodiments of the light source apparatuses made in accordance with the disclosed subject matter will now be described. A difference between the third exemplary light source apparatuses and the first exemplary light source apparatus 10 and 30 relates to a structure of the phosphor wheels 1 and 21 and a light-emitting wavelength of the semiconductor light source 5. As the semiconductor light source 5 of the third exemplary embodiments of the disclosed subject matter, an LED of GaN series that emits blue light having a wavelength of approximately 460 nanometers can be used, and also a laser diode that emits blue light can be used.

Figure 11A:
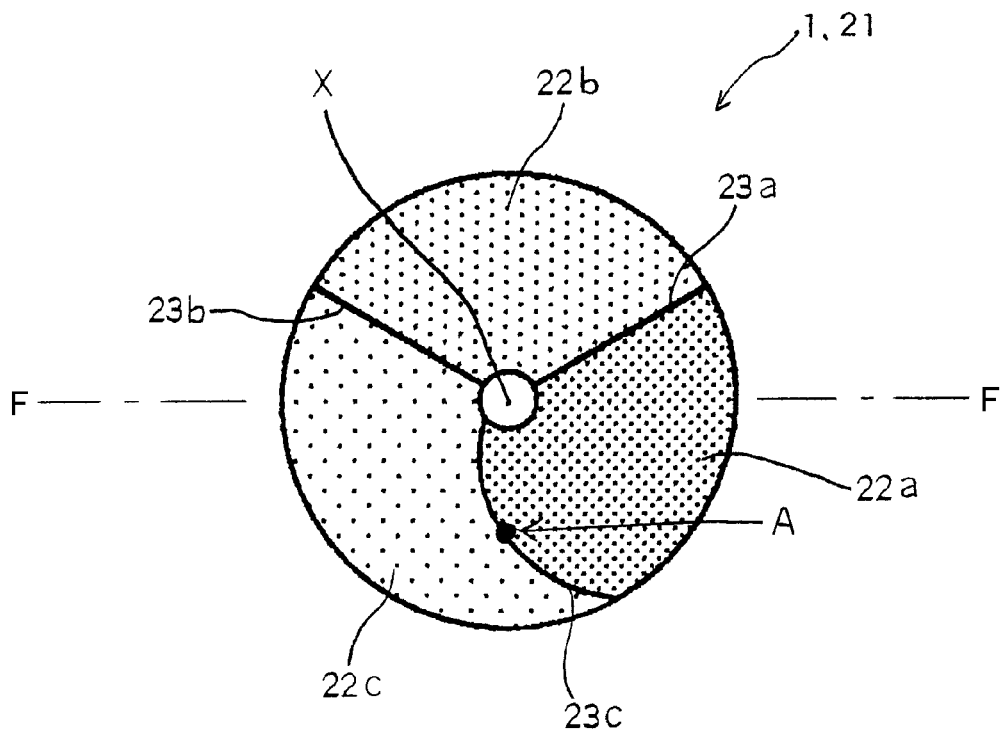
FIG. 11a is a schematic structural view showing a transmission/reflection type phosphor wheel of a third exemplary embodiment of the transmission/reflection type semiconductor light source apparatus made in accordance with principles of the disclosed subject matter.
Figure 11B:
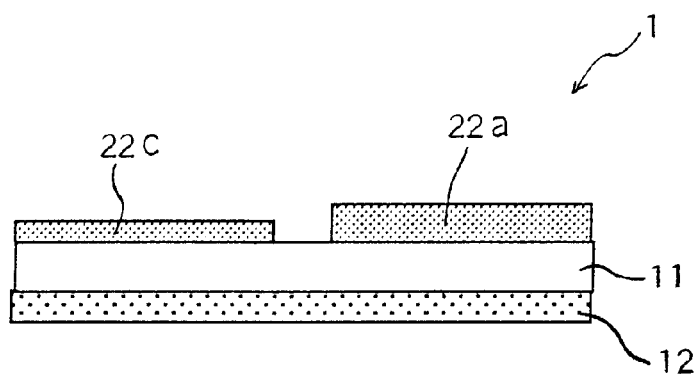
FIGS. 11b and 11c are cross-sectional views depicting cross-sections taken along line F-F of the transmission and reflection type phosphor wheels depicted in FIG. 11a, respectively.
Figure 11C:
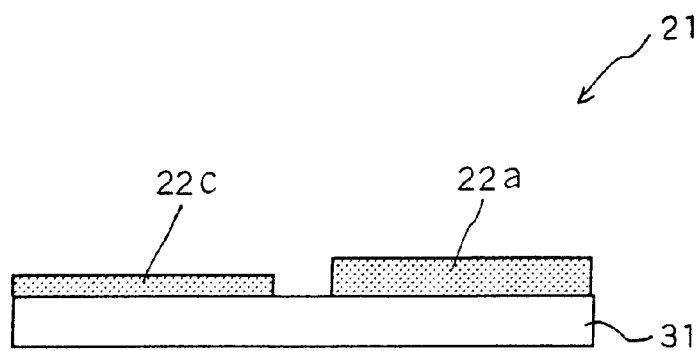

FIG. 11a is a schematic structural view showing a transmission/reflection type phosphor wheel of the third exemplary embodiment of the transmission/reflection type semiconductor light source apparatus made in accordance with principles of the disclosed subject matter, and FIGS. 11b and 11c are cross-sectional views depicting cross-sections taken along line F-F of the transmission and reflection type phosphor wheels depicted in FIG. 11a, respectively.

The transmission type phosphor wheel 1 can include: a first yellow phosphor layer 22a wavelength-converting the blue light emitted from the semiconductor light source 5 into white light and formed in a fan shape; a second yellow phosphor layer 22b having a lower concentration than that of the first yellow phosphor layer 22a and formed in a fan shape; a third yellow phosphor layer 22c having a lower concentration than that of the second yellow phosphor layer 22b and formed in a fan shape; a first boundary straight line 23a located between the first yellow phosphor layer 22a and the second yellow phosphor layer 22b; a second boundary straight line 23b located between the second yellow phosphor layer 22b and the third yellow phosphor layer 22c; and a boundary curved line 23c located between the first yellow phosphor layer 22a and the third yellow phosphor layer 22c.

Each concentration of the yellow phosphor layers 22a, 22b and 22c can be changed by adjusting each thickness of the phosphor layers, and can also be adjusted by changing a mixing ratio of an amount of phosphor particles to the transparent resin. Each concentration of the yellow phosphor layers 22a, 22b and 22c can become high by increasing the thickness of the phosphor layer and can become low by decreasing the thickness of the phosphor layer, and also each concentration of the yellow phosphor layers 22a, 22b and 22c can become high by increasing the amount of the phosphor particles in the transparent resin. As the yellow phosphor layers 22a, 22b and 22c, the materials for the yellow phosphor layers that are described in the first and second exemplary embodiments can be used.

The boundary curved line 23c can divide the first yellow phosphor layer 22a having a high concentration and the third yellow phosphor layer 22c having a low concentration so that a ratio of an arc on the first yellow phosphor layer 22a to an arc on the third yellow phosphor layer 22c becomes larger as an intersection of the arc and the boundary curved line 3c approaches the rotation axis X of the phosphor wheel 1 when each arc is part of an imaginary circle centered at the rotation axis X.

The transmission type semiconductor light source apparatus 10 including the phosphor wheel 1 can also change a distance between an intersection of the optical axis Y of the semiconductor light source 5 and the boundary curved line 23C and the rotation axis X of the phosphor wheel 1 by controlling the moving module 6. Therefore, the semiconductor light source 10 can change a color tone of light emitted from the semiconductor light source 5 via the phosphor wheel 1 as described in the first exemplary embodiment.

The semiconductor light source apparatus 10 can emit substantially white light due to an additive color mixture of the blue light emitted from the semiconductor light source 5 and excited lights of the three yellow phosphor layers 2a, 2b and 2c by rotating the phosphor wheel 1 at a substantially right angle to the optical axis Y of the semiconductor light source 5 by the motor 4. When an optical axis Y of the semiconductor light source 5 is located so as to pass through point A shown in FIG. 11a, because each of arcs on the three yellow phosphor layer 22a, 22b and 22c can substantially equal, the semiconductor light source apparatus 10 can emit a normal white light via the phosphor wheel 1.

In this case, when the optical axis Y of the semiconductor light source 5 approaches from point A toward the rotation axis X of the phosphor wheel 1 by controlling the moving module 6, the color tone of the white light emitted from the semiconductor light source apparatus 10 can change into a warm color including a yellow-white color more than other colors because a ratio of the light excited by the first yellow phosphor layer 22a having a high concentration to the light excited by the third yellow phosphor layer 2c having a low concentration increases.

On the contrary, when the optical axis Y of the semiconductor light source 5 moves from point A toward the circumference of the phosphor wheel 1 by controlling the moving module 6, the color tone of the white light can change into a cool color including more of a blue color than the other colors because a ratio of the light excited by the third yellow phosphor layer 22c having a low concentration to the light excited by the first yellow phosphor layer 22a having a high concentration increases.

In the transmission type phosphor wheel 1, the optical multilayer 12 can be disposed on a whole surface of the transparent substrate 11 so as to face the three yellow phosphor layers 22a, 22b and 22c. The optical multilayer 12 can transmit the blue light emitted from the semiconductor light source 5 and can also reflect the excited light reflected on the yellow phosphor layers 22a, 22b and 22c in a direction toward the light-emission of the semiconductor light source apparatus 10. Therefore, the transmission type semiconductor light source apparatus 10 can illuminate white light with high efficiency while it can continuously adjust the color tone of the white light from the cool color to the warm color.

As the optical multilayer 12, the dielectric multilayer that is made by alternatively laminating a high refractive material such as $TiO_2$, $LaTiO$, $Ta_2O_5$, $Nb_2O_5$ and the like and a low refractive material such as $SiO_2$, $MgF_2$ and the like can be used as described in the first and second embodiments. In the reflection type phosphor wheel 21, the yellow phosphor layers 22a, 22b and 22c can be disposed on the metallic substrate 31 such as an aluminum substrate. Accordingly, the reflection type semiconductor light source apparatus 30 can also illuminate white light with high efficiency via the metallic substrate 31 having a high reflectivity while it can continuously adjust the color tone of the white light from the cool color to the warm color.

Figure 12:
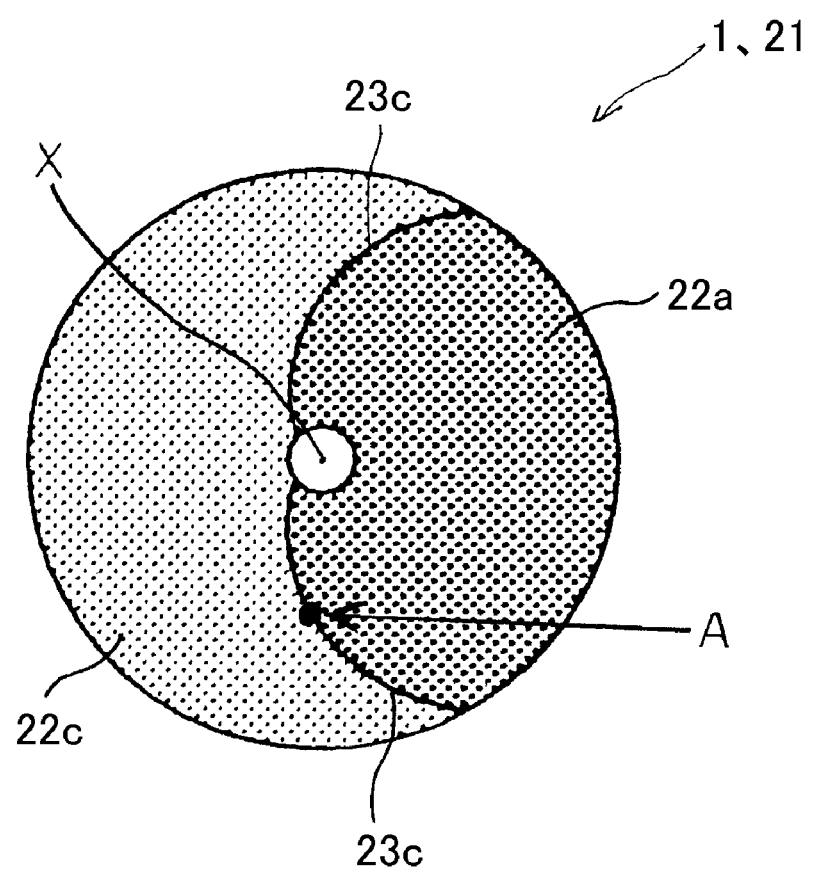

The above-described embodiment includes the three yellow phosphor layers 22a, 22b and 22c. However, as shown in FIG. 12, the phosphor wheels 1 and 21 can also include the first yellow phosphor layer 22a having a high concentration and the third yellow phosphor layer 22c having a lower concentration. In this case, when the optical axis Y of the semiconductor light source 5 is located so as to pass through point A shown in FIG. 12, because each of arcs on the two yellow phosphor layer 22a and 22c can be substantially equal, the light source apparatus 10 can emit a normal white light via the phosphor wheel 1.

When the optical axis Y of the semiconductor light source 5 is moved to approach from the point A toward the rotation axis X of the phosphor wheels 1 and 21 by controlling the moving module 6, each color tone of white light emitted from the light source apparatuses 10 and 30 can change into a warm color including comparatively more yellow color because a ratio of the light excited by the first yellow phosphor layer 22a having a high concentration to the light excited by the third yellow phosphor layer 2c having a low concentration increases.

In addition, when the optical axis Y of the semiconductor light source 5 moves from the point A toward the circumference of the phosphor wheels 1 and 21 by controlling the moving module 6, each color tone of white light can change into a cool color including comparatively more blue color because a ratio of the light excited by the third yellow phosphor layer 22c having a low concentration to the light excited by the first yellow phosphor layer 22a having a high concentration increases.

Figure 13A:
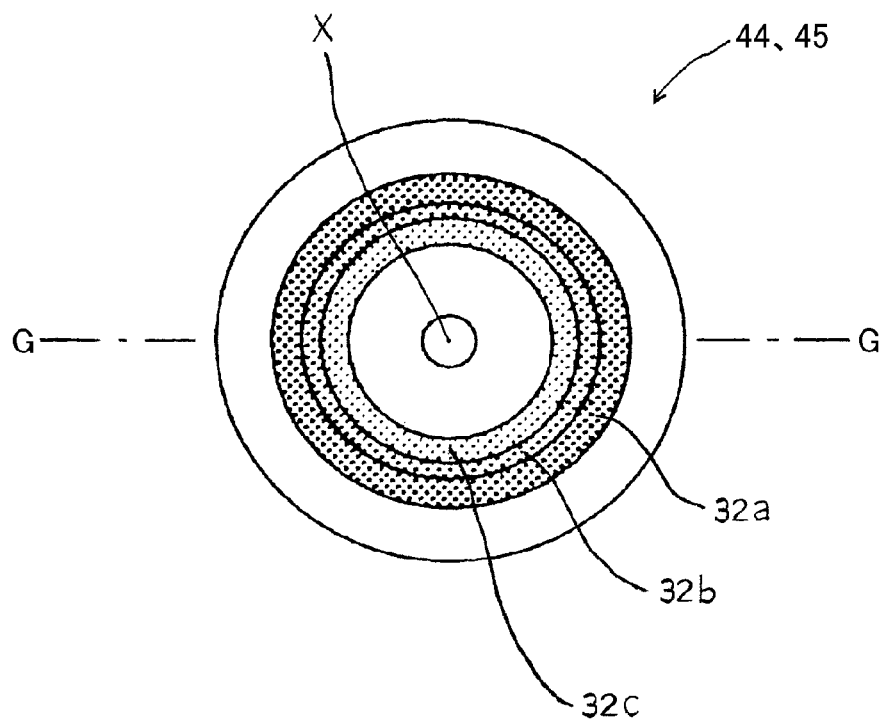
FIG. 13a is a schematic structural view showing a transmission/reflection type phosphor wheel of a first variation of the third exemplary semiconductor light source apparatuses.
Figure 13B:
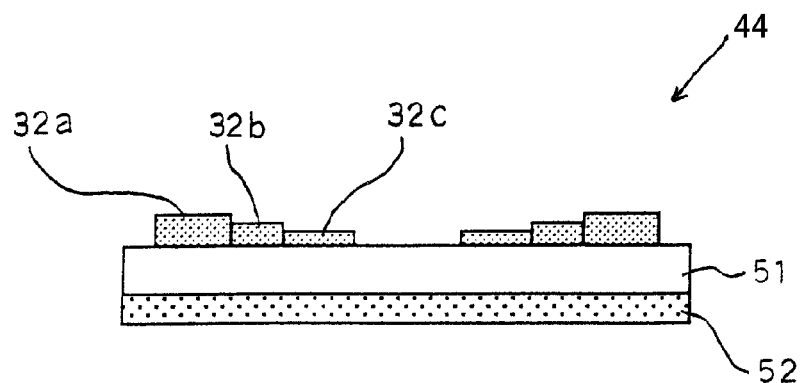
FIGS. 13b and 13c are cross-sectional views depicting cross-sections taken along line G-G of the transmission and reflection type phosphor wheels depicted in FIG. 13a, respectively.
Figure 13C:
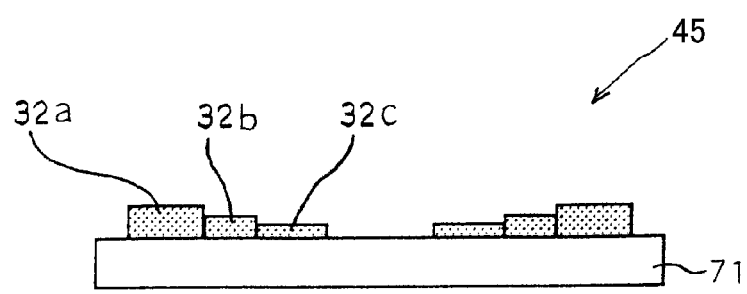

Variation of the third exemplary light source apparatuses 10 and 30 will now be described. A first variation of the third exemplary light source apparatuses 10 and 30 can vary with respect to the structure of the phosphor wheels 1 and 21. Accordingly, in the first variation of the third exemplary embodiment, the phosphor wheels 41 and 61 will now be described in detail with reference to FIGS. 13a, 13b and 13c. FIG. 13a is a schematic structural view showing a transmission/reflection type phosphor wheel of the first variation of the third exemplary semiconductor light source apparatuses, and FIGS. 13b and 13c are cross-sectional views depicting cross-sections taken along line G-G of the transmission and reflection type phosphor wheels depicted in FIG. 13a, respectively.

The transmission type phosphor wheel 44 can include: a first yellow phosphor layer 32a wavelength-converting the blur light emitted from the semiconductor light source 5 into white light and located in a concentric shape; a second yellow phosphor layer 32b having a lower concentration than that of the first yellow phosphor layer 32a and located adjacent to the first yellow phosphor layer 32a in a concentric shape; and a third yellow phosphor layer 32c having a lower concentration than that of the second yellow phosphor layer 32b and located adjacent to the second yellow phosphor layer 32b in a concentric shape.

Each of the yellow phosphor layers 32a, 32b and 32c can be made by mixing the above-described yellow phosphor with the transparent resin such as a silicone resin and can be applied on the transparent substrate 51 such as quartz glass substrate by the screen printing method. Each of the yellow phosphor layers 32a, 32b and 32c can be formed in a thicker thickness in turn to provide a higher concentration in order of the yellow phosphor layers 32a, 32b and 32c.

Figure 14:
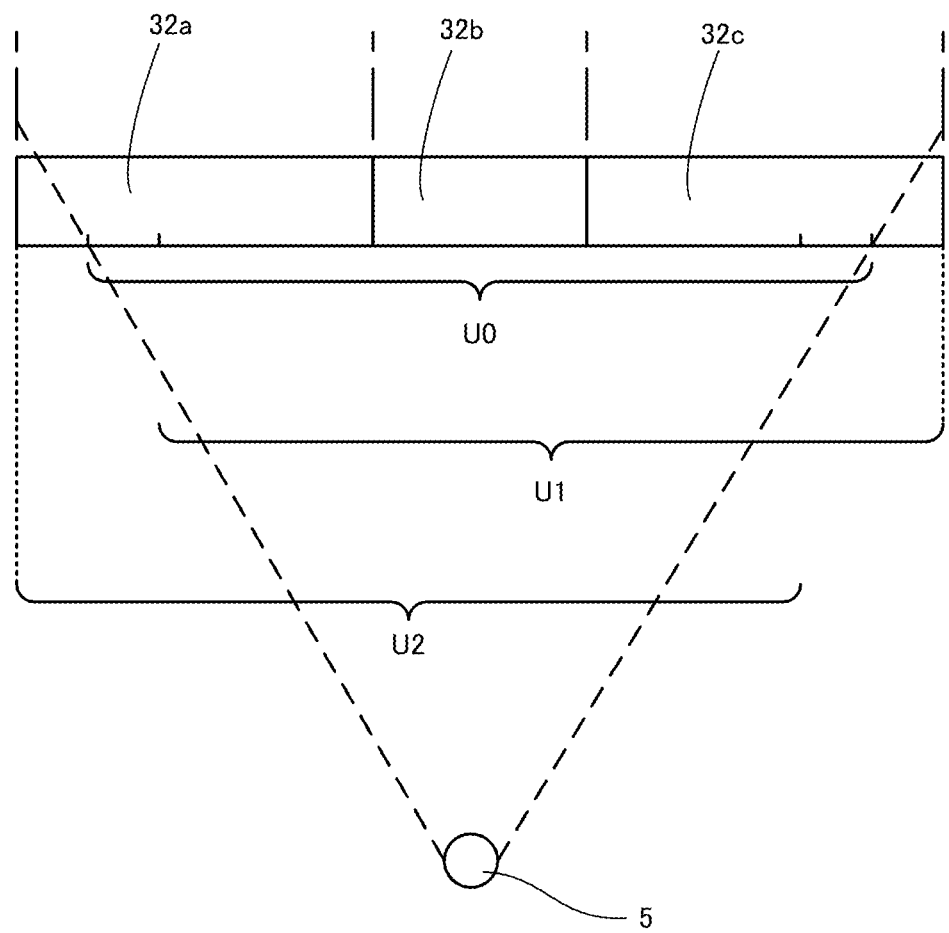
FIG. 14 is an explanatory diagram showing a relation between the semiconductor light source and a phosphor layer in the first variation of the third exemplary semiconductor light source apparatuses.

FIG. 14 is an explanatory diagram showing a relation between the semiconductor light source 5 and the yellow phosphor layers 32a, 32b and 32c in the first variation of the third embodiment. The semiconductor light source apparatus 10 including the phosphor wheel 44 can emit substantially white light due to an additive color mixture using the blue light emitted from the semiconductor light source 5 and lights excited by the three yellow phosphor layers 32a, 32b and 32c by rotating the phosphor wheel 41 with respect to the rotation axis X. When a light-emitting area of the semiconductor light source 5 is located so as to illuminate a light-emitting area U0 shown in FIG. 14, because each light-emitting area of the yellow phosphor layer 32a, 32b and 32c can substantially equal, the semiconductor light source apparatus 10 can emit a normal white light via the phosphor wheel 41.

Here, when the optical axis Y of the semiconductor light source 5 approaches the rotation axis X of the phosphor wheel 44 by controlling the moving module 6, the color tone of the white light emitted from the light source apparatus 10 can change into a cool color including comparatively more blue color because a ratio of the light excited by the third yellow phosphor layer 32c having a low concentration to the light excited by the first yellow phosphor layer 32a having a high concentration increases as shown by mark U1 in FIG. 14.

On the contrary, when the optical axis Y of the semiconductor light source 5 moves toward a circumference of the phosphor wheel 44 by controlling the moving module 6, the color tone of the white light can change into a warm color including comparatively more yellow color because a ratio of the light excited by the first yellow phosphor layer 32a having a high concentration to the light excited by the third yellow phosphor layer 32c having a low concentration increases.

In the transmission type phosphor wheel 44, the optical multilayer 52 can be disposed on a whole surface of the transparent substrate 51 so as to face the yellow phosphor layers 32a, 32b and 32c as shown in FIG. 13b. The optical multilayer 12 can transmit the blue light emitted from the semiconductor light source 5 and can also reflect the excited lights reflected on the yellow phosphor layers 32a, 32b and 32c in a direction toward the light-emission of the semiconductor light source apparatus 10. Therefore, the transmission type semiconductor light source apparatus 10 including the phosphor wheel 44 can illuminate the white light with high efficiency while it can continuously adjust the color tone of the white light from the cool color to the warm color.

As the optical multilayer 12, the dielectric multilayer that is made by alternatively laminating a high refractive material such as $TiO_2$, $LaTiO$, $Ta_2O_5$, $Nb_2O_5$ and the like and a low refractive material such as $SiO_2$, $MgF_2$ and the like can be used. In the reflection type phosphor wheel 45, the phosphor layers 32a, 32b and 32c can be disposed on the metallic substrate 71 such as an aluminum substrate. Accordingly, the reflection type semiconductor light source apparatus 30 including the phosphor wheel 45 can also illuminate the white light with high efficiency via the metallic substrate 71 having a high reflectivity while it can continuously adjust the color tone of the white light from the cool color to the warm color.

Figure 15A:
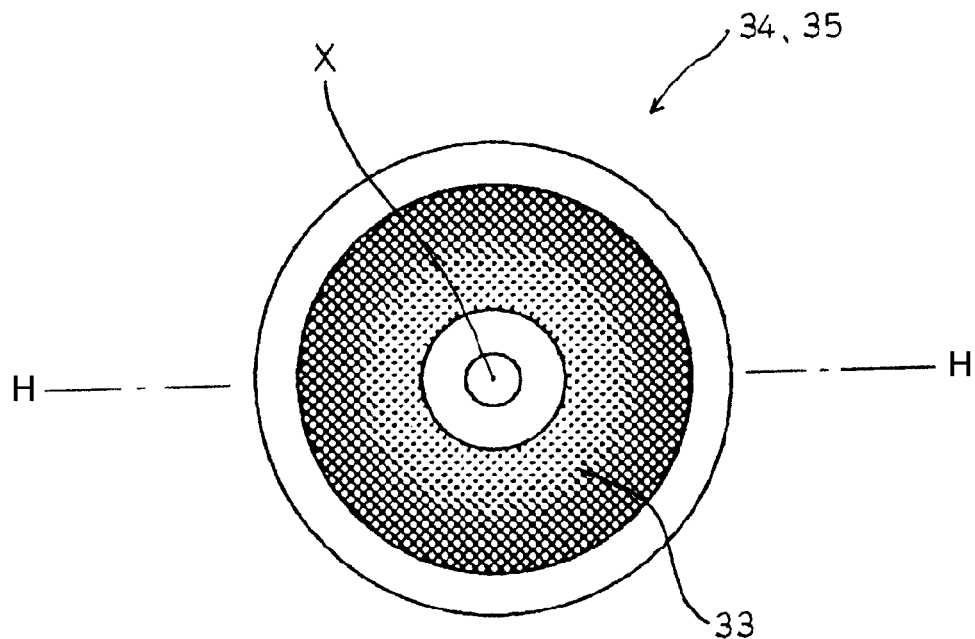
FIG. 15a is a schematic structural view showing a transmission/reflection type phosphor wheel of a second variation of the third exemplary semiconductor light source apparatuses.
Figure 15B:
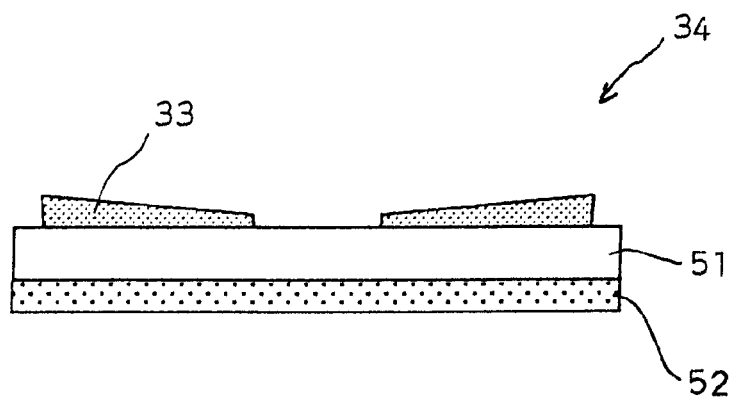
Figure 15C:
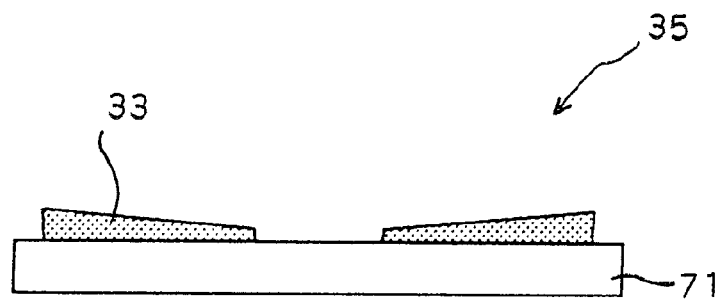

FIG. 15a is a schematic structural view showing a transmission/reflection type phosphor wheel of a second variation of the third exemplary semiconductor light source apparatuses, and FIGS. 15b and 15c are cross-sectional views depicting cross-sections taken along line H-H of the transmission and reflection type phosphor wheels depicted in FIG. 15a, respectively.

The phosphor wheel 34 can include a yellow phosphor layer 33 wavelength-converting the blur light emitted from the semiconductor light source 5 into white light. The yellow phosphor 33 can be formed in a concentric shape so that a concentration thereof become gradually high in an outward direction from the rotation axis X of the phosphor wheel 34. In this case, a thickness of the yellow phosphor layer 33 can become gradually thick in the outward direction from the rotation axis X of the phosphor wheel 34.

The phosphor layer 33 can be applied on the transparent substrate 51 such as quartz glass substrate by a screen printing method, in which a thickness of an opening of a screen becomes gradually thick. $Y_3Al_5O_{12}:Ce^{3+}$ (YAG), $(Sr, Ba)_2 SiO_4:Eu^{2+}$, $Ca_x(Si, Al)_{12}(O, N)_{16}:Eu^{2+}$ and the like can be used as the yellow phosphor of the phosphor layer 33, which is made by mixing the yellow phosphor with the transparent resin such as a silicone resin, an epoxy resin, etc.

The semiconductor light source apparatus 10 including the phosphor wheel 34 can emit substantially white light due to an additive color mixture using the blue light emitted from the semiconductor light source 5 and excited light of the yellow phosphor layers 33 by rotating the phosphor wheel 34 at a substantially right angle to the optical axis Y of the phosphor wheel 34 by the motor 4. In this case, when the optical axis Y of the semiconductor light source 5 approaches the rotation axis X of the phosphor wheel 34 by controlling the moving module 6, the color tone of the white light emitted from the semiconductor light source apparatus 10 can change into a cool color including comparatively more blue color because the concentration of the yellow phosphor layer 33 becomes low.

On the contrary, when the optical axis Y of the semiconductor light source 5 moves toward a circumference of the phosphor wheel 34 by controlling the moving module 6, the color tone of the white light can change into a warm color including comparatively more yellow color because the concentration of the yellow phosphor layer 33 becomes high. In the transmission type phosphor wheel 34, the optical multilayer 52 can be disposed on a whole surface of the transparent substrate 51 so as to face the yellow phosphor layer 33 as shown in FIG. 15b.

The optical multilayer 52 can transmit the blue light emitted from the semiconductor light source 5 and can also reflect the excited light reflected on the yellow phosphor layers 33 in a direction toward the light-emission of the semiconductor light source apparatus 10. Consequently, the transmission type semiconductor light source apparatus 10 including the phosphor wheel 34 can illuminate the white light with high efficiency while it can continuously adjust the color tone of the white light from the cool color to the warm color.

As the optical multilayer 52, the dielectric multilayer that is made by alternatively laminating the high refractive material such as $TiO_2$, $LaTiO$, $Ta_2O_5$, $Nb_2O_5$ and the like and the low refractive material such as $SiO_2$, $MgF_2$ and the like can be used. In the reflection type phosphor wheel 35, the yellow phosphor layers 33 can be disposed on a metallic substrate 71 such as an aluminum substrate. Accordingly, the reflection type semiconductor light source apparatus 30 including the phosphor wheel 35 can also illuminate the white light with high efficiency via the metallic substrate 71 having a high reflectivity while it can continuously adjust the color tone of the white light from the cool color to the warm color.

In the above-described third exemplary semiconductor light source apparatuses 10 and 30, the single yellow phosphor layer having a respective different concentration can be located in the phosphor wheel. Accordingly, the color breakup cannot occur as compared with the conventional light source apparatus using a phosphor wheel, which includes the red, green and blue phosphor layers. Thus, the third exemplary semiconductor light source apparatuses 10 and 30 can emit white light having a large amount of light intensity and a preferable light distribution by using a high power blue LED as the semiconductor light source 5 while they can continuously adjust a color tone of the white light from the cool color to the warm color.

Figure 16A:
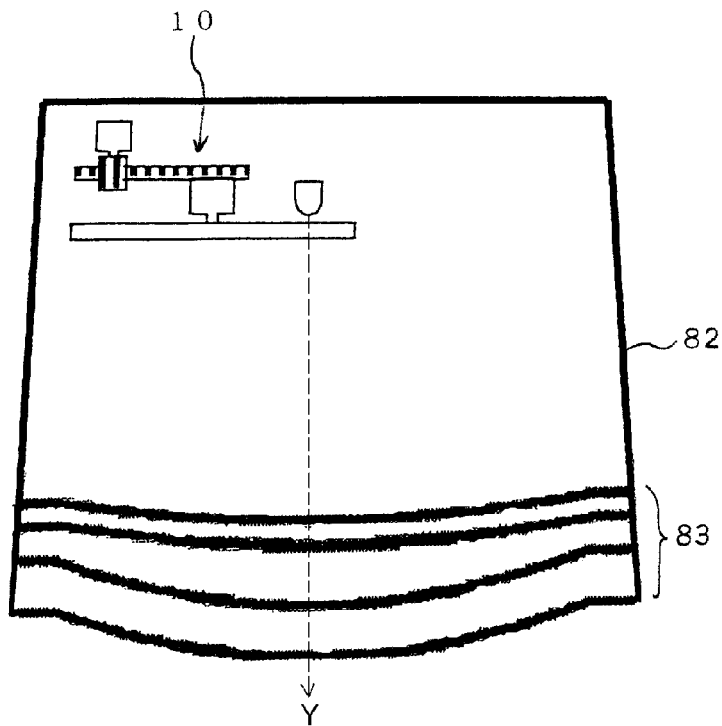
FIGS. 16a and 16b are schematic structural views showing a first and second exemplary embodiment of a lighting unit using a semiconductor light source apparatus, made in accordance with principles of the disclosed subject matter.
Figure 16B:
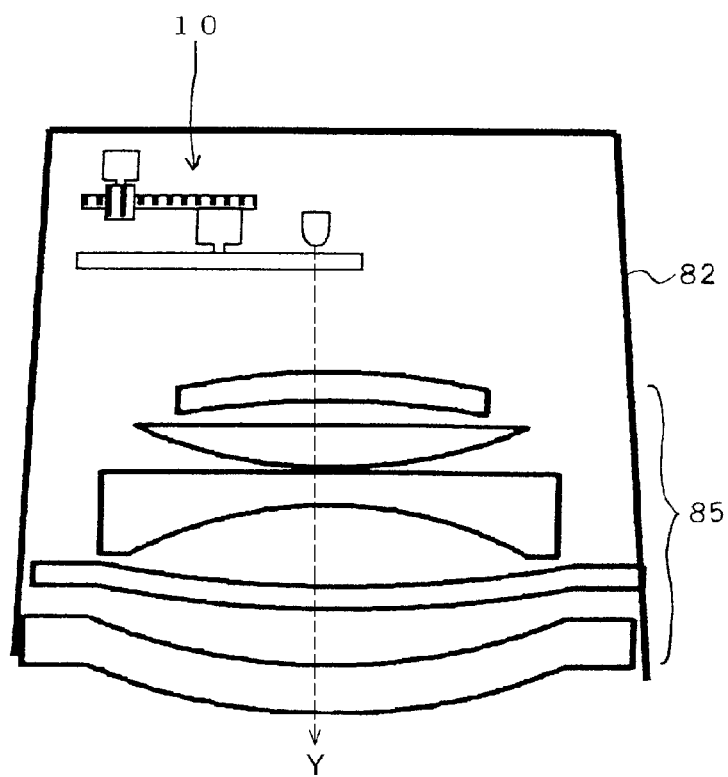

Lighting units using the above-described semiconductor light source apparatuses 10 and 30 are described with reference to FIGS. 16a and 16b. FIGS. 16a and 16b are schematic structural views showing a first and second exemplary embodiment of a lighting unit using the semiconductor light source apparatus 10 of the disclosed subject matter. The semiconductor light source apparatus 10 can be attached to a housing 82 so as to be covered with the housing 82. In this case, an optical lens 83 can be located in front of the semiconductor light source apparatus 10 to match light distributions for various lighting units.

The optical lens 83 can include a projector lens having an optical axis, which is composed of a convex lens. When the optical axis of the projector lens corresponds to the substantially optical axis of the semiconductor light source 5, the lighting unit including the projector lens can provide a favorable light distribution in focus for a projector, a stage lighting, etc. In addition, another exemplary optical lens 85 can include a zoom lens having an optical axis, which is structured by at least one convex lens and at least one concave lens.

When the optical axis of the zoom lens corresponds to the substantially optical axis of the semiconductor light source 5, because the light unit can provide a favorable light distribution in focus, the lighting unit including the zoom lens can be used for a lighting system having a zoom function such as a projector, stage lighting, etc. Thus, the disclose subject matter can provide adjustable high power lighting units having favorable light distributions by using a high power semiconductor light source, which can be used for various lighting units such as a projector, a stage lighting, general lighting, etc.

Various modifications of the above disclosed embodiments can be made without departing from the spirit and scope of the presently disclosed subject matter. For example, cases where the above-described phosphor layers are formed in the substantially circular shape are described. However, the phosphor layers cannot be limited to this shape and can be formed in various shapes such as an ellipsoidal shape and the like so long as a mixing ratio of lights varies according to the distance between the intersection of the optical axis of the semiconductor light source and the phosphor wheel and the rotation axis of the phosphor wheel.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A semiconductor light source apparatus, comprising:
   a motor having a rotation axis:
   a transparent substrate having a plate shape and a rotation axis, and the rotation axis of the transparent substrate aligned with the rotation axis of the motor so that the transparent substrate is rotatable at a substantially right angle with respect to the rotation axis of the transparent substrate by the motor;
   at least one phosphor layer disposed on a first surface of the transparent substrate;
   an optical multilayer disposed on a second surface of the transparent substrate so as to face the at least one phosphor layer via the transparent substrate, and including a dielectric multilayer that is made by alternative laminating a high refractive material and a low refractive material;

a semiconductor light source having an optical axis and a light-emitting area, the semiconductor light source located adjacent to the optical multilayer so that the optical axis of the semiconductor light source intersects with at least one of the first and second surface of the transparent substrate at a substantially right angle while the light-emitting area of the semiconductor light source is located on the at least one phosphor layer via the optical multilayer; and a moving module connected to the motor, wherein the moving module is configured to adjust a distance between the rotation axis of the transparent substrate and an intersection of the optical axis of the semiconductor light source with the surface of the transparent substrate, wherein during operation of the semiconductor light source the optical multilayer is configured to transmit light emitted from the semiconductor light source and also is configured to reflects a part of visible light reflected on the at least one phosphor layer in a direction toward light-emission of the light source apparatus.

2. The semiconductor light source apparatus according to claim 1, wherein the semiconductor light source is an ultraviolet light-emitting device and the at least one phosphor layer is configured with a red phosphor layer formed in a fan shape, a green phosphor layer formed in a fan shape and a blue phosphor formed in a fan shape, and wherein a ratio of a first arc on the red phosphor layer to a second arc on the blue phosphor layer varies according to a location of intersection of each arc with a boundary between the red phosphor layer and the blue phosphor layer when each arc is part of an imaginary circle centered at the rotation axis of the transparent substrate, and the first arc is an entire portion of the imaginary circle located in the red phosphor layer and the second arc is an entire portion of the imaginary circle located in the blue phosphor layer.

3. The semiconductor light source apparatus according to claim 1, wherein the semiconductor light source is an ultraviolet light-emitting device and the at least one phosphor layer is configured with a red phosphor layer formed in a concentric shape, a green phosphor layer formed in a concentric shape, and a blue phosphor formed in a concentric shape, and wherein the green phosphor layer is located between the red phosphor layer and the blue phosphor layer.

4. The semiconductor light source apparatus according to claim 1, wherein the semiconductor light source is a blue light-emitting device configured to emit blue light and the at least one phosphor layer includes a yellow phosphor layer having a plurality of concentrations configured to wavelength-covert the blue light emitted from the blue light-emitting device, and wherein a concentration of the yellow phosphor layer is configured to vary in a stepwise fashion in a direction toward a rotation axis of the transparent substrate so that a ratio of a first arc on a yellow phosphor layer having a low concentration to a second arc on a yellow phosphor layer having a high concentration varies according to a location of intersection of an imaginary circle that contains each arc and a boundary between the yellow phosphor layer having a low concentration and the yellow phosphor layer having a high concentration, wherein each arc is part of the imaginary circle centered at the rotation axis of the transparent substrate and the first arc is an entire portion of the imaginary circle located in the yellow phosphor layer having a low concentration and the second arc is an entire portion of the imaginary circle located in the yellow phosphor layer having a high concentration.

5. The semiconductor light source apparatus according to claim 1, wherein the semiconductor light source is a blue light-emitting device configured to emit blue light and the at least one phosphor layer is configured with a yellow phosphor layer having a plurality of concentrations configured to wavelength-covert the blue light emitted from the light-emitting device, and wherein a concentration of the yellow phosphor layer is configured to vary in a concentric shape.

6. A lighting unit including the semiconductor light source apparatus according to claim 1, further comprising:

a housing located so as to cover the semiconductor light source apparatus; and a projector lens having an optical axis located adjacent to the housing so that the optical axis of the projector lens substantially corresponds to the optical axis of the semiconductor light source.

7. The lighting unit according to claim 6, further comprising;

at least one convex lens having an optical axis and at least one concave lens having an optical axis, the convex lens and the concave lens are located adjacent to the projector lens so that the optical axes of the at least one convex lens and the at least one concave lens substantially correspond to the optical axis of the projector lens.

8. A semiconductor light source apparatus, comprising:

a motor having a rotation axis:

an aluminum substrate having a plate shape and a rotation axis, and the rotation axis of the aluminum substrate being aligned with the rotation axis of the motor so that the aluminum substrate is rotatable at a substantially right angle with respect to the rotation axis of the aluminum substrate by the motor;

at least one phosphor layer disposed on a surface of the aluminum substrate;

a semiconductor light source having an optical axis and a light-emitting area, the semiconductor light source located adjacent to the at least one phosphor layer so that the optical axis of the semiconductor light source intersects with the surface of the aluminum substrate at an angle while the light-emitting area of the semiconductor light source is located on the at least one phosphor layer; and a moving module connected to the motor, wherein the moving module is configured to adjust a distance between the rotation axis of the aluminum substrate and an intersection of the optical axis of the semiconductor light source with the surface of the aluminum substrate, and a direction of light emitted along the optical axis of the semiconductor light source varies in a direction toward the at least one phosphor layer after being reflected on the aluminum substrate.

9. The semiconductor light source apparatus according to claim 8, wherein the semiconductor light source is an ultraviolet light-emitting device and the at least one phosphor layer is configured with a red phosphor layer formed in a fan shape, a green phosphor layer formed in a fan shape and a blue phosphor formed in a fan shape, and wherein a ratio of a first arc on the red phosphor layer to a second arc on the blue phosphor layer varies according to a location of intersection of each arc with a boundary between the red phosphor layer and the blue phosphor layer, wherein each arc is part of an imaginary circle centered at the rotation axis of the aluminum substrate, and the first arc is an entire portion of the imaginary circle located in the red phosphor layer and the second arc is an entire portion of the imaginary circle located in the blue phosphor layer.

10. The semiconductor light source apparatus according to claim 8, wherein the semiconductor light source is an ultraviolet light-emitting device and the at least one phosphor layer is configured with a red phosphor layer formed in a concentric shape, a green phosphor layer formed in a concentric shape, and a blue phosphor formed in a concentric shape, and wherein the green phosphor layer is located between the red phosphor layer and the blue phosphor layer.

11. A lighting unit including the semiconductor light source apparatus according to claim 8, further comprising:
   a housing located so as to cover the semiconductor light source apparatus; and
   a projector lens having an optical axis located adjacent to the housing so that the optical axis of the projector lens substantially corresponds to the optical axis of the semiconductor light source.

12. A semiconductor light source apparatus, comprising:
   a motor having a rotation axis;
   a transparent substrate having a plate shape and a rotation axis, and the rotation axis of the transparent substrate being aligned with the rotation axis of the motor so that the transparent substrate is configured to rotate at a substantially right angle to the rotation axis of the transparent substrate by the motor;
   at least one phosphor layer disposed on a surface of the transparent substrate so as to expose a part of the transparent substrate from the at least one phosphor layer;
   an optical multilayer disposed on another surface of the transparent substrate so as to face the at least one phosphor layer via the transparent substrate, and including a dielectric multilayer that is made by alternative laminating a high refractive material and a low refractive material;
   a blue light-emitting device having an optical axis and a light-emitting area, the blue light-emitting device located adjacent to the optical multilayer so that the optical axis of the blue light-emitting device intersects with at least one of the surface and the another surface of the transparent substrate at a substantially right angle while the light-emitting area of the blue light-emitting device is located on the part of the transparent substrate exposed from the at least one phosphor layer and the at least one phosphor layer via the optical multilayer, and blue light emitted from the blue light-emitting device being wavelength-converted by the at least one phosphor layer; and
   a moving module connected to the motor, and the moving module configured to adjust a distance between the rotation axis of the transparent substrate and an intersection of the optical axis of the blue light-emitting device with the surface of the transparent substrate.

13. The semiconductor light source apparatus according to claim 12, wherein the at least one phosphor layer is configured with a red phosphor layer formed in a fan shape and a green phosphor layer formed in a fan shape, and wherein a ratio of a first arc on the red phosphor layer to a second arc on the part of the transparent substrate exposed from the red and green phosphor layers varies according to a location of intersection of each arc with a boundary between the red phosphor layer and the part of the transparent substrate, wherein each arc is part of an imaginary circle centered at the rotation axis of the transparent substrate, and the first arc is an entire portion of the imaginary circle located in the red phosphor layer and the second arc is an entire portion of the imaginary circle located in the part of the transparent substrate exposed from the red and green phosphor layers.

14. The semiconductor light source apparatus according to claim 12, wherein the at least one phosphor layer is configured with a red phosphor layer formed in a concentric shape and a green phosphor layer formed in a concentric shape, and wherein the green phosphor layer is located between the red phosphor layer and the part of the transparent substrate exposed from the red and green phosphor layers.

15. The semiconductor light source apparatus according to claim 12, wherein the at least one phosphor layer is configured with a yellow phosphor layer formed in a fan shape, and wherein a ratio of a first arc on the yellow phosphor layer to a second arc on the part of the transparent substrate exposed from the yellow phosphor layer varies according to a location of intersection of each arc and a boundary between the yellow phosphor layer and the part of the transparent substrate, wherein each arc is part of an imaginary circle centered at the rotation axis of the transparent substrate, and the first arc is an entire portion of the imaginary circle located in the yellow phosphor layer and the second arc is an entire portion of the imaginary circle located in the part of the transparent substrate exposed from the yellow phosphor layer.

16. The semiconductor light source apparatus according to claim 12, wherein the at least one phosphor layer is configured with a yellow phosphor layer formed in a concentric shape, and wherein the yellow phosphor layer is located adjacent to the part of the transparent substrate formed in a concentric shape.

17. A lighting unit including the semiconductor light source apparatus according to claim 12, further comprising:
   a housing located so as to cover the semiconductor light source apparatus; and
   a projector lens having an optical axis located adjacent to the housing so that the optical axis of the projector lens substantially corresponds to the optical axis of the semiconductor light source.

18. The lighting unit according to claim 17, further comprising:
   at least one convex lens having an optical axis and at least one concave lens having an optical axis, the convex lens and the concave lens are located adjacent to the projector lens so that the optical axes of the at least one convex lens and the at least one concave lens substantially correspond to the optical axis of the projector lens.

19. A semiconductor light source apparatus, comprising:
   a motor having a rotation axis:
   a metallic substrate having a plate shape and a rotation axis, and the rotation axis of the metallic substrate being aligned with the rotation axis of the motor so that the metallic substrate is configured to be rotated at a substantially right angle with respect to the rotation axis of the metallic substrate by the motor;
   at least one phosphor layer disposed on a surface of the metallic substrate so as to expose a part of the metallic substrate from the at least one phosphor layer;
   a blue light-emitting device having an optical axis and a light-emitting area, the blue light-emitting device located adjacent to the at least one phosphor layer so that the optical axis of the blue light-emitting device intersects with the surface of the metallic substrate at an angle while the light-emitting area of the blue light-emitting device is located on the part of the metallic substrate exposed from the at least one phosphor layer and the at least one phosphor layer, and blue light emitted from the blue light-emitting device being wavelength-converted by the at least one phosphor layer; and a moving module connected to the motor, the moving module configured to adjust a distance between the rotation axis of the metallic substrate and an intersection of the optical axis of the blue light-emitting device with the surface of the metallic substrate, and light emitted along the optical axis of the blue light-emitting device varies in a direction toward the at least one phosphor layer after being reflected on the metallic substrate, wherein the at least one phosphor layer is configured with a yellow phosphor layer formed in a fan shape, and wherein a ratio of a first arc on the yellow phosphor layer to a second arc on the part of the metallic substrate exposed from the yellow phosphor layer varies according to a location of intersection of each arc with a boundary between the yellow phosphor layer and the part of the metallic substrate, wherein each arc is part of an imaginary circle centered at the rotation axis of the metallic substrate, and the first arc is an entire portion of the imaginary circle located in the yellow phosphor layer and the second arc is an entire portion of the imaginary circle located in the part of the metallic substrate exposed from the yellow phosphor layer.

20. A lighting unit including the semiconductor light source apparatus according to claim 19, further comprising:

a housing located so as to cover the semiconductor light source apparatus; and a projector lens having an optical axis located adjacent to the housing so that the optical axis of the projector lens substantially corresponds to the optical axis of the semiconductor light source.

* * * * *